United States Patent
Qiu et al.

(10) Patent No.: US 12,032,537 B2
(45) Date of Patent: Jul. 9, 2024

(54) DEDUPLICATING METADATA BASED ON A COMMON SEQUENCE OF CHUNK IDENTIFIERS

(71) Applicant: Cohesity, Inc., San Jose, CA (US)

(72) Inventors: Zhihuan Qiu, San Jose, CA (US); Yu Liu, Milpitas, CA (US)

(73) Assignee: Cohesity, Inc., San Jose, CA (US)

( * ) Notice: Subject to any disclaimer, the term of this patent is extended or adjusted under 35 U.S.C. 154(b) by 159 days.

(21) Appl. No.: 17/215,865

(22) Filed: Mar. 29, 2021

(65) Prior Publication Data

US 2022/0309046 A1    Sep. 29, 2022

(51) Int. Cl.
*G06F 16/215* (2019.01)

(52) U.S. Cl.
CPC .................. *G06F 16/215* (2019.01)

(58) Field of Classification Search
CPC .... G06F 16/215; G06F 16/21; G06F 11/1453; G06F 11/1435
See application file for complete search history.

(56) References Cited

U.S. PATENT DOCUMENTS

| | | | | |
|---|---|---|---|---|
| 8,108,353 B2 * | 1/2012 | Balachandran | ..... | H03M 7/3084 707/664 |
| 9,329,942 B2 * | 5/2016 | Chavda | ............... | G06F 16/9024 |
| 10,706,014 B1 | 7/2020 | Gupta | | |
| 10,754,731 B1 | 8/2020 | Arumugam | | |
| 11,474,673 B1 | 10/2022 | Abdul-Jawad | | |
| 2009/0271454 A1 | 10/2009 | Anglin | | |
| 2009/0300321 A1 * | 12/2009 | Balachandran | ....... | G06F 12/023 711/216 |
| 2009/0313248 A1 * | 12/2009 | Balachandran | ..... | H03M 7/3084 |
| 2010/0161608 A1 * | 6/2010 | Jain | ..................... | G06F 16/1748 707/E17.046 |
| 2010/0250501 A1 | 9/2010 | Mandagere | | |
| 2010/0333116 A1 | 12/2010 | Prahlad | | |

(Continued)

FOREIGN PATENT DOCUMENTS

WO    WO-2018075042 A1 *    4/2018    ........... G06F 16/215

OTHER PUBLICATIONS

Fu et al., Design Tradeoffs for Data Deduplication Performance in Backup Workloads, 13th USENIX Conference on File and Storage Technologies (FAST '15), Feb. 2015, pp. 331-344.

(Continued)

*Primary Examiner* — Maher N Algibhah
(74) *Attorney, Agent, or Firm* — Van Pelt, Yi & James LLP

(57) ABSTRACT

A first group of chunk identifiers associated with a first content identifier structure of a first metadata element and a second group of chunk identifiers associated with a second content identifier structure of a second metadata element are determined. A common sequence of chunk identifiers across at least a portion of the first group of chunk identifiers associated with the first content identifier structure and the second group of chunk identifiers associated with the second content identifier structure is determined. A portion of the first group of chunk identifiers associated with the first content identifier structure and a portion of the second group of chunk identifiers associated with the second content identifier structure is updated to reference a common sequence identifier in place of the determined common sequence of chunk identifiers.

19 Claims, 16 Drawing Sheets

(56) References Cited

U.S. PATENT DOCUMENTS

| | | |
|---|---|---|
| 2011/0225130 A1 | 9/2011 | Tokoro |
| 2013/0018855 A1 | 1/2013 | Eshghi |
| 2013/0041872 A1 | 2/2013 | Aizman |
| 2013/0086006 A1 | 4/2013 | Colgrove |
| 2013/0097380 A1 | 4/2013 | Colgrove |
| 2013/0268496 A1 | 10/2013 | Baldwin |
| 2013/0282672 A1 | 10/2013 | Tashiro |
| 2014/0114932 A1 | 4/2014 | Mallaiah |
| 2015/0356109 A1 | 12/2015 | Arikawa |
| 2016/0026652 A1 | 1/2016 | Zheng |
| 2017/0131934 A1 | 5/2017 | Kaczmarczyk |
| 2018/0329631 A1 | 11/2018 | Swift |
| 2019/0121673 A1 | 4/2019 | Gold |
| 2019/0130434 A1 | 5/2019 | Lurie |
| 2020/0081644 A1 | 3/2020 | Jeyaram |
| 2020/0125450 A1 | 4/2020 | Aron |
| 2020/0272492 A1 | 8/2020 | Guturi |
| 2021/0109900 A1 | 4/2021 | McIlroy |
| 2021/0117441 A1 | 4/2021 | Patel |
| 2021/0303155 A1 | 9/2021 | Meister |
| 2021/0303519 A1 | 9/2021 | Periyagaram |
| 2021/0365296 A1* | 11/2021 | Shilane ............... G06F 9/5016 |

OTHER PUBLICATIONS

Kaplan et al., From Processing-in-Memory to Processing-in-Storage, Supercomputing Frontiers and Innovations, 2017, pp. 99-116, vol. 4, No. 3.

Li et al., Efficient Hybrid Inline and Out-of-Line Deduplication for Backup Storage, Oct. 12, 2018.

Ma et al., Lazy Exact Deduplication, 2017.

Vinod Mohan, Inline vs. Post-Process Deduplication and Compression, DataCore, Mar. 8, 2021, https://www.datacore.com/blog/inline-vs-post-process-deduplication-compression/.

Wang et al., I-sieve: An Inline High Performance Deduplication System Used in Cloud Storage, Tsinghua Science and Technology, Feb. 2015, pp. 17-27, vol. 20, No. 1.

Wu et al., HPDedup: A Hybrid Prioritized Data Deduplication Mechanism for Primary Storage in the Cloud, 2017.

* cited by examiner

| ObjectID | NodeID | ChildrenID | Ref Count | Content Identifier Structure | ChunkID(s) | Chunk FileID |
|---|---|---|---|---|---|---|
| 1 | OR1 | OI1, OI2 | 0 | | | |
| 1 | OI1 | OL1, OL2 | 1 | | | |
| 1 | OI2 | OL3, OL4 | 1 | | | |
| 1 | OL1 | | 1 | Brick 1 | ABCDEF | 1, 2 |
| 1 | OL2 | | 1 | Brick 2 | GHIJK | 2, 3 |
| 1 | OL3 | | 1 | Brick 3 | LMNOP | 3, 4 |
| 1 | OL4 | | 1 | Brick 4 | QRXY | 5 |
| 2 | OR2 | OI3, OI4 | 1 | | | |
| 2 | OI3 | OL5, OL6 | 1 | | | |
| 2 | OI4 | OL7, OL8 | 1 | | | |
| 2 | OL5 | | 1 | Brick 5 | ABCDEX | 1, 2, 5 |
| 2 | OL6 | | 0 | Brick 6 | HYIJK | 2, 3, 5 |
| 2 | OL7 | | 1 | Brick 7 | KEMBA | 1, 2, 3, 4 |
| 2 | OL8 | | 1 | Brick 8 | PADY | 1, 4, 5 |

| Chunk File ID | Chunk ID | Chunk File Offset | Storage Node | Primary Owner | Secondary Owner |
|---|---|---|---|---|---|
| Chunk File 1 | A | 0 – 256 kb | 1, 3 | Object 1 | Object 2 |
| Chunk File 1 | B | 256 kb – 512 kb | 1, 3 | Object 1 | Object 2 |
| Chunk File 1 | C | 512 kb – 768 kb | 1, 3 | Object 1 | Object 2 |
| Chunk File 1 | D | 768 kb – 1024 kb | 1, 3 | Object 1 | Object 2 |
| Chunk File 2 | E | 0 – 256 kb | 2, 4 | Object 1 | Object 2 |
| Chunk File 2 | F | 256 kb – 512 kb | 2, 4 | Object 1 | - |
| Chunk File 2 | G | 512 kb – 768 kb | 2, 4 | Object 1 | - |
| Chunk File 2 | H | 768 kb – 1024 kb | 2, 4 | Object 1 | Object 2 |
| Chunk File 3 | I | 0 – 256 kb | 2, 3 | Object 1 | Object 2 |
| Chunk File 3 | J | 256 kb – 512 kb | 2, 3 | Object 1 | Object 2 |
| Chunk File 3 | K | 512 kb – 768 kb | 2, 3 | Object 1 | Object 2 |
| Chunk File 3 | L | 768 kb – 1024 kb | 1, 3 | Object 1 | - |
| Chunk File 4 | M | 0 – 256 kb | 3, 4 | Object 1 | Object 2 |
| Chunk File 4 | N | 256 kb – 512 kb | 3, 4 | Object 1 | - |
| Chunk File 4 | O | 512 kb – 768 kb | 3, 4 | Object 1 | - |
| Chunk File 4 | P | 768 kb – 1024 kb | 3, 4 | Object 1 | Object 2 |
| Chunk File 5 | Q | 0 – 256 kb | 1, 4 | Object 1 | - |
| Chunk File 5 | R | 256 kb – 512 kb | 1, 4 | Object 1 | Object 2 |
| Chunk File 5 | X | 512 kb – 768 kb | 1, 4 | Object 1 | Object 2 |
| Chunk File 5 | Y | 768 kb – 1024 kb | 1, 4 | Object 1 | Object 2 |

FIG. 5B

| TreeID | NodeID | ChildrenID | Ref Count | Content Identifier Structure | ChunkID | Chunk FileID |
|---|---|---|---|---|---|---|
| 1 | OR1 | OI1, OI2 | 0 | | | |
| 1 | OI1 | OL1, OL2 | 1 | | | |
| 1 | OI2 | OL3, OL4 | 1 | | | |
| 1 | OL1 | | 1 | Brick 1 | αEF | 2, 6 |
| 1 | OL2 | | 1 | Brick 2 | GHIμ | 2, 3, 7 |
| 1 | OL3 | | 1 | Brick 3 | LMNOP | 3, 4 |
| 1 | OL4 | | 1 | Brick 4 | QRXY | 5 |
| 2 | OR2 | OI3, OI4 | 1 | | | |
| 2 | OI3 | OL5, OL6 | 1 | | | |
| 2 | OI4 | OL, OL8 | 1 | | | |
| 2 | OL5 | | 1 | Brick 5 | αEX | 2, 5, 6 |
| 2 | OL6 | | 0 | Brick 6 | HYIμ | 2, 3, 5, 7 |
| 2 | OL7 | | 1 | Brick 7 | KEMBA | 1, 2, 3, 4 |
| 2 | OL8 | | 1 | Brick 8 | PADY | 1, 4, 5 |

| Chunk File ID | Chunk ID | Chunk File Offset | Storage Node | Primary Owner | Secondary Owner |
|---|---|---|---|---|---|
| Chunk File 6 | α | 0 – 1024 kb | 1, 3 | Object 1 | Object 2 |
| Chunk File 7 | μ | 0 – 512 kb | 1, 3 | Object 1 | Object 2 |

DEDUPLICATING METADATA BASED ON A COMMON SEQUENCE OF CHUNK IDENTIFIERS

BACKGROUND OF THE INVENTION

Data associated with a primary system is backed up to a storage system. The storage system stores the data associated with the primary system and generates metadata that enables the backed data associated with the primary system to be located. The storage system can back up the primary system according to a schedule (e.g., daily). Over time, the storage system may store duplicative data associated with the primary system and duplicative metadata. The storage system has a finite amount of storage space. Storing duplicative data associated with the primary system and duplicative metadata is an inefficient use of the storage system's storage resources.

BRIEF DESCRIPTION OF THE DRAWINGS

Various embodiments of the invention are disclosed in the following detailed description and the accompanying drawings.

FIG. 5A is a diagram illustrating a data structure in accordance with some embodiments.

FIG. 5B is a diagram illustrating a data structure in accordance with some embodiments.

FIG. 6A is a diagram illustrating a data structure in accordance with some embodiments.

FIG. 6B is a diagram illustrating a data structure in accordance with some embodiments.

DETAILED DESCRIPTION

Figure 1:
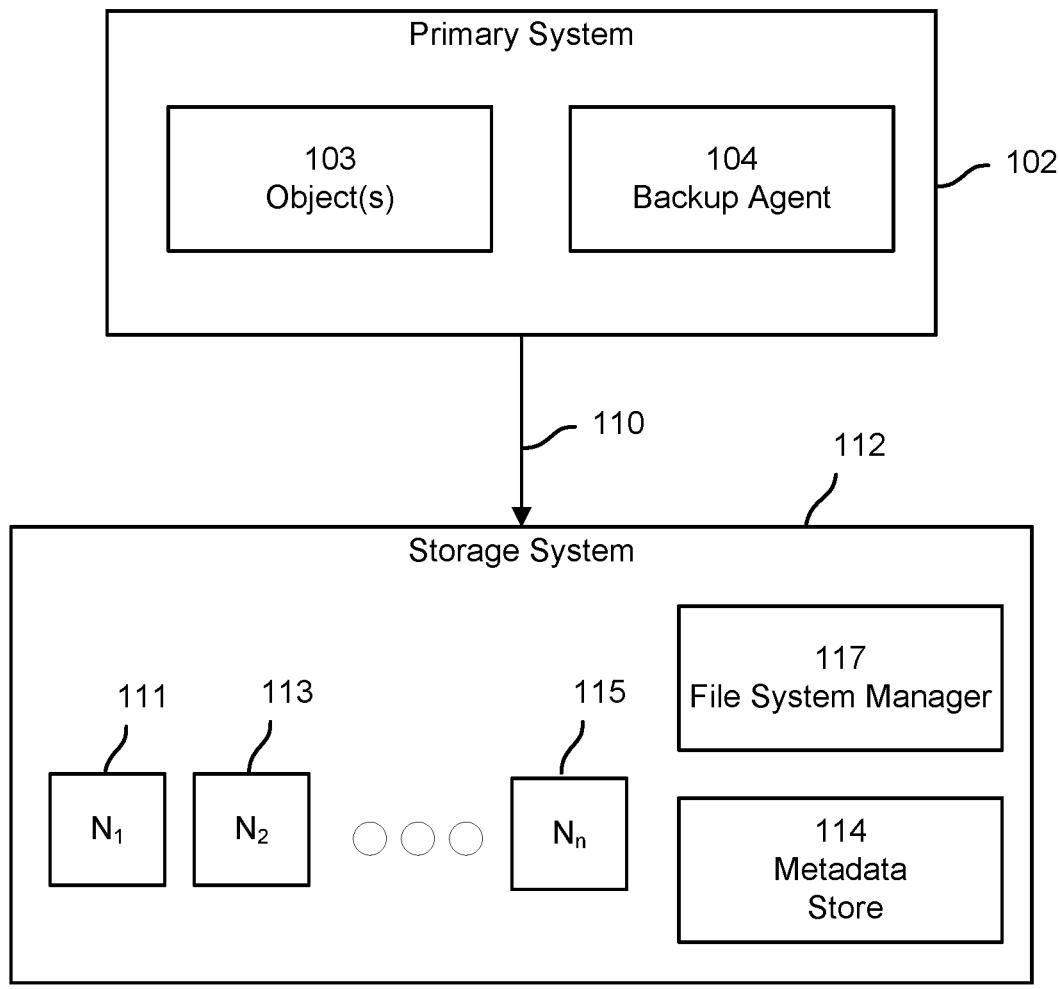
FIG. 1 is a block diagram illustrating an embodiment of a system for deduplicating metadata.

A technique to deduplicate the metadata that enables the backed up data associated with a primary system to be located is disclosed herein. A backup of the primary system is performed. The backup may be a full backup or an incremental backup of the primary system's file system data. A storage system receives the file system data included in the backup, stores the data included in the backup, and generates metadata that enables the data included in the backup to be located.

The generated metadata may be a tree data structure, which may be based on a B+ tree structure (or other type of tree structure in other embodiments). When the file system data of the primary system is backed up at a particular moment in time, the storage system generates a corresponding tree data structure. The tree data structure captures a view of the primary system at the particular moment in time. The view may be comprised of a snapshot tree and one or more object metadata structures.

A snapshot tree enables file system data associated with the primary system to be located. A snapshot tree includes a root node, one or more levels of one or more intermediate nodes associated with the root node, and one or more leaf nodes associated with an intermediate node of the lowest intermediate node of the lowest intermediate level. The root node of the snapshot tree includes one or more pointers to the one or more intermediate nodes. Each intermediate node includes one or more pointers to other nodes (e.g., a lower intermediate node or a leaf node). A leaf node may include a pointer or identifier to an object metadata structure.

An object metadata structure captures a view of an object associated with the primary system at a particular moment in time. An object may be a file, an application, a virtual machine, a database, a container, etc. The object metadata structure enables the data associated with the object to be located. The storage system is configured to generate a corresponding object metadata structure for each object that is backed up to the storage system. The object metadata structure may include a root node, one or more levels of one or more intermediate nodes associated with the root node, and one or more leaf nodes associated with an intermediate node of the lowest intermediate node of the lowest intermediate level. The root node of the snapshot tree includes one or more pointers to the one or more intermediate nodes. Each intermediate node includes one or more pointers to other nodes (e.g., a lower intermediate node or a leaf node). A leaf node of an object metadata structure (referred to as a "metadata element" herein) is configured to store a corresponding value. The value stored by a metadata element may be an identifier of a content identifier structure.

A content identifier structure is associated with one or more data chunks. The storage system is configured to store a first data structure (e.g., chunk metadata table) that associates a content identifier structure with one or more chunk identifiers corresponding to the one or more data chunks. An example of a chunk identifier is an SHA-1 hash value, SHA-2 hash value, or any other type of hash value. Each SHA-1 hash value has a size of 20 bytes. The first data structure includes entries for each of the content identifier structures. An entry associates the content identifier structure with a group of chunk identifiers and one or more chunk file identifiers. The storage system is configured to store a second data structure (e.g., chunk file metadata table) that associates a chunk file identifier with a chunk file storing a plurality of data chunks. The second data structure may associate a chunk identifier with a chunk file offset of a chunk file.

The first and second data structures are stored in a first storage tier associated with the storage system (e.g., a solid-state drive (SSD)). When a request for an object is received by the storage system, the storage system inspects the first data structure and the second data structure stored in the first storage tier to quickly locate the data associated with the requested object. The amount of storage in the first storage tier is finite. As the storage system stores an increasing number of backups of the primary system, the amount of information stored by the first and second data structures increases.

An entry of the first data structure may store a chunk identifier sequence that partially overlaps with chunk identifier sequences associated with one or more other entries of the first data structure. For example, a first entry corresponding to a first content identifier structure may be associated with a first sequence of chunk identifiers, such as "ABCDEF" and a second entry corresponding to a second content identifier structure may be associated with a second sequence of chunk identifiers, such as "ABCDEX." The first and second sequences of chunk identifiers partially overlap, i.e., the chunk identifier sequence of "ABCDE" is included in both the first and second sequences of chunk identifiers. This is an inefficient use of the first storage tier because duplicative metadata is being stored in the first storage tier. In this example, the first and second entries each store 120 bytes of SHA-1 information with 100 bytes of the SHA-1 information being duplicative.

The technique to deduplicate the metadata that enables the backed up data associated with a primary system to be located includes scanning the first data structure to identify potential chunk identifier sequence(s) that may be common to a plurality of entries. Other storage systems may determine all potential chunk identifier sequences that may be common to a plurality of entries. However, this may require a lot of time and resources to determine. Using the technique disclosed herein, the storage system may determine a subset of all potential chunk identifier sequences that are common to a plurality of entries. This provides a balanced approach by reducing the amount of time and resources needed to deduplicate the metadata, but enabling a sufficient amount of metadata to be deduplicated.

Determining a subset of all potential chunk identifier sequence(s) that are common to a plurality of entries includes determining a chunk identifier marker for a chunk identifier sequence. The storage system may determine a chunk identifier marker for a chunk identifier sequence by performing a modulo operation to determine a modulus value (e.g., M % N where M is the chunk identifier and N is the divisor) for each chunk identifier included in the chunk identifier sequence associated with a content identifier structure. N may be selected based on a length of a chunk identifier sequence. In some embodiments, N is selected based on the amount of resources available (e.g., computing resources, time) to deduplicate metadata. In some embodiments, N=11. In some embodiments, N is less than 11. In some embodiments, N is greater than 11. A chunk identifier may be determined to be a candidate as a chunk identifier marker for the chunk identifier sequence in the event the determined modulus value for the chunk identifier is zero. The number of common chunk identifier sequences that are common to a plurality of entries varies based on the value of N. For example, the number of potential common chunk identifier sequences that are common to a plurality of entries is less if N is greater than 11 when compared to the number of potential chunk identifier sequences that are common to a plurality of entries if N is less than 11. Other systems may use alternative methods to determine chunk identifier markers. However, performing a modulo operation to determine chunk identifier markers for potential chunk identifier sequences that are common to a plurality of entries is an efficient way to determine common chunk identifier sequences.

The storage system may determine potential chunk identifier sequences for an object based on the candidate chunk identifier markers. For example, a first content identifier structure may be associated with the chunk identifier sequence of "ABCDEF" and a second content identifier structure may be associated with the chunk identifier sequence of "ABCDEX." The chunk identifiers of "D" and "X" may be determined to be candidates for chunk identifier markers.

In some embodiments, a chunk identifier marker is a starting chunk identifier for a potential chunk identifier sequence that is common to a plurality of entries. For example, the potential chunk identifier sequence may be "DEF" or "DEX." A potential chunk identifier sequence may include the chunk identifier marker as the first chunk identifier in the chunk identifier sequence and a chunk identifier that precedes a next chunk identifier marker as the last chunk identifier included in the chunk identifier sequence.

In some embodiments, a chunk identifier marker is an ending chunk identifier for a potential chunk identifier sequence that is common to a plurality of entries. The potential chunk identifier sequence may include any non-chunk identifier markers that precede the chunk identifier marker. In the above example, the potential chunk identifier sequences are "ABCD" or "ABCDEX."

The storage system may determine a common chunk identifier sequence within a particular offset range (e.g., 32 MB) of an object. In some embodiments, the particular offset range corresponds to a single content identifier structure. In some embodiments, the particular offset range corresponds to a plurality of content identifier structures of an object. In some embodiments, a chunk identifier sequence is common to a plurality of content identifier structures associated with the same object. In some embodiments, a chunk identifier sequence is common to a plurality of content identifier structures associated with a plurality of objects.

In some embodiments, the shared chunk identifier sequence spans a plurality of content identifier structures associated with an object. The plurality of content identifier structures associated with the object are contiguous and correspond to adjacent data chunks of the data object. For example, a first content identifier structure included in a first object metadata structure associated with a first object may be associated with a chunk identifier sequence of "ABCDE" and a second content identifier structure included in the first object metadata structure associated with the first object may be associated with a chunk identifier sequence of "FGHIJ." The first content identifier structure included in the first metadata structure associated with the first object may correspond to an object offset of 0-2 MB of the first object and the second content identifier structure included in the first metadata structure associated with the first object may correspond to an object offset of 2 MB-4 MB of the first object. A first content identifier structure included in a second object metadata structure associated with a second object may be associated with a chunk identifier sequence of "BCDEF" and a second content identifier structure included in the second object metadata structure associated with a second object may be associated with a chunk identifier sequence of "GXYZ." The first content identifier structure included in a second metadata structure associated with a second object may correspond to an object offset of 10 MB-12 MB of the second object and the second content identifier structure included in the second metadata structure associated with the second object may correspond to an object offset of 12 MB-14 MB of the second object. In this example, one of the common chunk identifier sequences is "BCDEFG."

After the potential chunk identifier sequences are determined, the storage system determines which of the potential chunk identifier sequences are common to a plurality of entries. For the chunk identifier sequences that are common to a plurality of entries, the storage system determines the number of times that the chunk identifier sequences are common to a plurality of entries. In the event a common chunk identifier sequence is common to more than a threshold number of entries, the storage system is configured to generate in a new chunk file a new data chunk corresponding to data chunks associated with the common chunk identifier sequence. For example, a new data chunk "a" may be generated to store the data chunks associated with the common chunk identifier sequence of "ABCD." The second data structure is updated to include an entry corresponding to the new data chunk.

Subsequently, the storage system is configured to update entries of the first data structure that are associated with the common chunk identifier sequence to reference the common sequence identifier that corresponds to the new data chunk in place of the common sequence of chunk identifiers and to reference the new chunk file. For example, instead of storing respective chunk identifier sequences of "ABCDEF" and "ABCDEX," the first entry corresponding to a first content identifier structure and the second entry corresponding to a second content identifier structure can be updated to store a chunk identifier sequence of "αEF" and "αEX" where "α" refers to the common sequence of chunk identifiers "ABCD." In this example, instead of storing 120 bytes of chunk identifier information, the first and second entries both store 60 bytes of chunk identifier information. This is a more efficient use of the first storage tier because the amount of duplicative metadata stored in the first storage tier is reduced.

FIG. 1 is a block diagram illustrating an embodiment of a system for deduplicating metadata. In the example shown, system 100 includes a primary system 102 coupled to a storage system 112 via connection 110. Connection 110 may be a wired or wireless connection. Connection 110 may be a LAN, WAN, intranet, the Internet, and/or a combination thereof.

Primary system 102 is a computing system that stores file system data. The file system data may include a plurality of objects (e.g., a file (content files, text files, application files, etc.), an application, a virtual machine, a database, a container, etc.) and metadata associated with the plurality of objects. The objects may be different object types. Primary system 102 may be comprised of one or more servers, one or more computing devices, one or more storage devices, and/or a combination thereof. Primary system 102 may be configured to send or make available a backup of file system data to storage system 112 according to one or more backup policies. In some embodiments, a backup policy indicates that file system data is to be backed up on a periodic basis (e.g., hourly, daily, weekly, monthly, etc.), when a threshold size of data has changed, or in response to a command from a user associated with primary system 102.

Primary system 102 may be configured to host one or more objects 103. Examples of objects include, but are not limited to, a virtual machine, a database, an application, a container, a pod, etc. Primary system 102 may include one or more storage volumes (not shown) that are configured to store file system data associated with primary system 102. The file system data associated with primary system 102 includes the data associated with the one or more objects 103.

Backup agent 104 may be configured to cause primary system 102 to perform a backup (e.g., a full backup or incremental backup). A full backup may include all of the file system data of primary system 102 at a particular moment in time. In some embodiments, a full backup for a particular object of the one or more objects 103 is performed and the full backup of the particular object includes all of the object data associated with the particular object at a particular moment in time. In some embodiments, backup agent 104 is running on primary system 102. In some embodiments, backup agent 104 is running in one of the one or more objects 103 (e.g., an agent may be running in a virtual machine). In some embodiments, a backup agent 104 is running on primary system 102 and a separate backup agent 104 is running in one of the one or more objects 103. In some embodiments, an object includes a backup function and is configured to perform a backup on its own without backup agent 104. In some embodiments, primary system 102 includes a backup function and is configured to perform a backup on its own without backup agent 104. In some embodiments, storage system 112 may provide instructions to primary system 102, causing primary system 102 to execute backup functions without the backup agent 104.

Storage system 112 includes nodes 111, 113, 115. Although three nodes are shown, storage system 112 may be comprised of n nodes. In some embodiments, a node of storage system 112 includes a processor, memory, and a plurality of storage devices. The plurality of storage devices may include one or more solid state drives, one or more hard disk drives, or a combination thereof.

In some embodiments, the nodes are homogenous nodes where each node has the same capabilities (e.g., processing, storage, memory, etc.). In some embodiments, at least one of the nodes is a heterogeneous node with different capabilities (e.g., processing, storage, memory, etc.) than the other nodes of storage system 112.

In some embodiments, a node of storage system 112 includes a processor and memory, and is coupled to a separate storage device. The separate storage device may include one or more storage devices (e.g., flash storage devices). A storage device may be segmented into a plurality of partitions. Each of the nodes 111, 113, 115 may be allocated one or more of the partitions. The one or more partitions allocated to a node may be configured to store data associated with some or all of the plurality of objects that were backed up to storage system 112. For example, the separate storage device may be segmented into 10 partitions and storage system 112 may include 10 nodes. A node of the 10 nodes may be allocated one of the 10 partitions.

In some embodiments, a node of storage system 112 includes a processor, memory, and a storage device. The node may be coupled to a separate storage device. The separate storage device may include one or more storage devices. A storage device may be segmented into a plurality of partitions. Each of the nodes 111, 113, 115 may be allocated one or more of the partitions. The one or more partitions allocated to a node may be configured to store data associated with some or all of the plurality of objects that were backed up to storage system 112. For example, the separate storage device may be segmented into 10 partitions and storage system 112 may include 10 nodes. A node of the 10 nodes may be allocated one of the 10 partitions.

Storage system 112 may be a cloud instantiation of a backup system. A configuration of cloud instantiation of storage system 112 may be a virtual replica of a backup system. For example, a backup system may be comprised of three storage nodes, each storage node with a storage capacity of 10 TB. A cloud instantiation of the backup system may be comprised of three virtual nodes, each virtual node with a storage capacity of 10 TB. In other embodiments, a cloud instantiation of a backup system may have more storage capacity than an on-premises instantiation of a backup system. In other embodiments, a cloud instantiation of a backup system may have less storage capacity than an on-premises instantiation of a backup system.

Storage system 112 is configured to ingest the file system data included in a backup and store the data across a plurality of nodes 111, 113, 115. The file system data is stored as a plurality of data chunks in a plurality of chunk files. Storage system 112 may include a file system manager 117 that is configured to organize the file system data of the backup using a tree data structure. Storage system 112 may store a plurality of tree data structures in metadata store 114. Storage system 112 may generate a snapshot tree and one or more metadata structures for each backup.

The tree data structure may be used to capture different views of data. A view of data may correspond to a full backup, an incremental backup, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of a primary system, an object, or data generated on or by the storage system at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with primary system 102, an object at a particular time and the file's contents, or a file generated on or by storage system 112, for which there is an associated reference restoration point, may be determined from the snapshot tree, regardless if the associated reference restoration was a full backup restoration point or an intermediate backup restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with an object that is less than a limit size, an identifier of a data brick, a pointer to an object metadata structure, an identifier to an object metadata structure, a pointer to a data chunk stored on the storage cluster, etc.

An object metadata structure captures a view of an object associated with the primary system at a particular moment in time. The object metadata structure enables the data associated with the object to be located. The storage system is configured to generate a corresponding object metadata structure for each object that is backed up to the storage system. The object metadata structure may include a root node, one or more levels of one or more intermediate nodes associated with the root node, and one or more leaf nodes associated with an intermediate node of the lowest intermediate node of the lowest intermediate level. The root node of the snapshot tree includes one or more pointers to the one or more intermediate nodes. Each intermediate node includes one or more pointers to other nodes (e.g., a lower intermediate node or a leaf node). A leaf node of an object metadata structure, also referred to as a "metadata element," is configured to store a corresponding value. The value stored by a metadata element may be an identifier of a content identifier structure.

The object metadata structure allows a chain of object metadata structures to be linked together by allowing a node of a later version of an object metadata structure to reference a node of a previous version of an object metadata structure. The previous version of the object metadata structure may correspond to an object included in an earlier backup. For example, a root node or an intermediate node of an object metadata structure corresponding to a second backup may reference an intermediate node or leaf node of an object metadata corresponding to a first backup.

A content identifier structure is associated with one or more data chunks. Each content identifier structure has an associated reference count. The reference count indicates a number of object metadata structures to which the content identifier structure is associated, i.e., the number of objects that include the one or more data chunks associated with the content identifier structure.

Storage system 112 is configured to store in metadata store 114 a first data structure (e.g., chunk metadata table) that associates a content identifier structure with one or more chunk identifiers corresponding to the one or more data chunks. An example of a chunk identifier is an SHA-1 hash value, an SHA-2 hash value, or any other hash value. Each SHA-1 hash value has a size of 20 bytes. The first data structure includes entries for each of the content identifier structures. An entry associates the content identifier structure with a group of chunk identifiers and one or more chunk file identifiers. Storage system 112 is configured to store in metadata store 114 a second data structure (e.g., chunk file metadata table) that associates a chunk file identifier with a chunk file storing a plurality of data chunks. In some embodiments, the first data structure and the second data structure are combined into a single data structure.

The first data structure is stored in a first storage tier associated with storage system 112 (e.g., a solid-state drive (SSD)). When a request for an object is received by storage system 112, storage system 112 inspects the first data structure and the second data structure stored in the first storage tier to quickly locate the data associated with the requested object. The amount of storage in the first storage tier is finite. As storage system 112 stores an increasing number of backups of primary system 102, the amount of information stored by the first and second data structures increases.

An entry of the first data structure may store a chunk identifier sequence that partially overlaps with chunk identifier sequences associated with one or more other entries of the first data structure. For example, a first entry corresponding to a first content identifier structure may be associated with a first sequence of chunk identifiers, such as "ABCDEF" and a second entry corresponding to a second content identifier structure may be associated with a second sequence of chunk identifiers, such as "ABCDEX." The first and second sequences of chunk identifiers partially overlap, i.e., the chunk identifier sequence of "ABCDE" is included in both the first and second sequences of chunk identifiers. This is an inefficient use of the first storage tier because duplicative metadata is being stored in the first storage tier. In this example, the first and second entries store 120 bytes of SHA-1 information with 100 bytes of the SHA-1 information being duplicative.

The technique to deduplicate the metadata that enables the backed up data associated with a primary system to be located includes scanning the first data structure to identify potential chunk identifier sequence(s) that may be common to a plurality of entries.

In some embodiments, storage system 112 divides the first data structure (e.g., chunk metadata table) into a plurality of segments and assigns a worker process to a corresponding segment. Each worker process is configured to identify, within the assigned segment, entries that include a chunk identifier sequence that partially overlaps with a chunk identifier sequence associated with at least one other entry of the first data structure. The worker processes may work in parallel to identify the entries. This reduces the amount of time needed to identify entries of chunk identifier sequences that overlap with other entries. After each worker process completes its task, the identified entries may be merged to generate a complete list of entries with a chunk identifier sequence that overlaps with other entries.

Storage system 112 may determine a chunk identifier marker for a chunk identifier sequence by performing a modulo operation to determine a modulus value (e.g., M % N) for each chunk identifier included in the chunk identifier sequence associated with a content identifier structure. A chunk identifier may be determined to be a candidate as a chunk identifier marker for the chunk identifier sequence in the event the determined modulus value for the chunk identifier is zero.

Storage system 112 may determine potential chunk identifier sequences for an object based on the candidate chunk identifier markers. For example, a first content identifier structure may be associated with the chunk identifier sequence of "ABCDEF" and a second content identifier structure may be associated with the chunk identifier sequence of "ABCDEX." The chunk identifiers of "D" and "X" may be determined to be candidates for chunk identifier markers.

In some embodiments, a chunk identifier marker is a starting chunk identifier for a potential chunk identifier sequence that is common to a plurality of entries. For example, potential chunk identifier sequences that are common to a plurality of entries may be "DEF" or "DEX." A potential chunk identifier sequence that is common to a plurality of entries may include the chunk identifier marker as the first chunk identifier in the chunk identifier sequence and a chunk identifier that precedes a next chunk identifier marker as the last chunk identifier included in the potential chunk identifier sequence that is common to a plurality of entries. In some embodiments, a potential chunk identifier sequence that is common to a plurality of entries includes the chunk identifier marker as the first chunk identifier in the chunk identifier sequence and a threshold number of chunk identifiers that occur after the chunk identifier marker (e.g., 3 or 4).

In some embodiments, a chunk identifier marker is an ending chunk identifier for a potential chunk identifier sequence that is common to a plurality of entries. The potential chunk identifier sequence that is common to a plurality of entries may include any non-chunk identifier markers that precede the chunk identifier marker. In the above example, the common chunk identifier sequence is "ABCD." In some embodiments, a potential chunk identifier sequence that is common to a plurality of entries includes the chunk identifier marker as the last chunk identifier in the chunk identifier sequence and a threshold number of chunk identifiers that occur before the chunk identifier marker (e.g., 3 or 4).

Storage system 112 may determine a common chunk identifier sequence within a particular offset range (e.g., 32 MB) of an object. In some embodiments, the particular offset range corresponds to a single content identifier structure. In some embodiments, the particular offset range corresponds to a plurality of content identifier structures of an object. In some embodiments, a chunk identifier sequence is common to a plurality of content identifier structures associated with a same object. In some embodiments, a chunk identifier sequence is common to a plurality of content identifier structures associated with a plurality of objects.

In some embodiments, the shared chunk identifier sequence spans a plurality of content identifier structures associated with an object. The plurality of content identifier structures associated with the object are contiguous and correspond to adjacent data chunks of the data object. For example, a first content identifier structure included in a first metadata structure associated with a first object may be associated with a chunk identifier sequence of "ABCDE" and a second content identifier structure included in the first metadata structure associated with the first object may be associated with a chunk identifier sequence of "FGHIJ." The first content identifier structure included in the first metadata structure associated with the first object may correspond to an object offset of 0-2 MB of the first object and the second content identifier structure included in the first metadata structure associated with the first object may correspond to an object offset of 2 MB-4 MB of the first object. A first content identifier structure included in a second metadata structure associated with a second object may be associated with a chunk identifier sequence of "BCDEF" and a second content identifier structure included in the second metadata structure associated with a second object may be associated with a chunk identifier sequence of "GXYZ." The first content identifier structure included in a second metadata structure associated with a second object may correspond to an object offset of 10 MB-12 MB of the second object and the second content identifier structure included in the second metadata structure associated with the second object may correspond to an object offset of 12 MB-14 MB of the second object. In this example, one of the common chunk identifier sequences is "BCDEFG."

After the potential chunk identifier sequences are determined, storage system 112 determines which of the potential chunk identifier sequences are common to a plurality of entries. For the chunk identifier sequences that are common to a plurality of entries, storage system 112 determines the number of times that the chunk identifier sequences are common to a plurality of entries. In the event a common chunk identifier sequence is common to more than a threshold number of entries, storage system 112 is configured to generate in a new chunk file a new data chunk corresponding to data chunks associated with the common chunk identifier sequence. For example, a new data chunk "α" may be generated to store the data chunks associated with the common chunk identifier sequence of "ABCD." The second data structure is updated to include an entry corresponding to the new data chunk.

The threshold number of entries is a configurable number. In some embodiments, the threshold number of entries is 2. In some embodiments, the threshold number of entries is larger than 2 (e.g., between 10-20). The process of updating a chunk metadata table, chunk file metadata table, and creating new chunk files requires a certain amount of time and resources to perform. The storage system may perform other processes, such as backup, restore, replication, migration, etc., during this process. Thus, the threshold number of entries may be adjusted based on available resources of the storage system to balance the desired space savings with the time and resources required to achieve the desired space savings.

Subsequently, storage system 112 is configured to update entries of the first data structure that are associated with the common chunk identifier sequence to reference a common sequence identifier that corresponds to the new data chunk in place of the common sequence of chunk identifiers and to reference the new chunk file. For example, instead of storing respective chunk identifier sequences of "ABCDEF" and "ABCDEX," the first entry corresponding to a first content identifier structure and the second entry corresponding to a second content identifier structure can be updated to store a chunk identifier sequence of "αEF" and "αEX" where "α" refers to the common sequence of chunk identifiers "ABCD." In this example, instead of storing 120 bytes of chunk identifier information, the first and second entries both store 60 bytes of chunk identifier information. This is a more efficient use of the first storage tier because the amount of duplicative metadata stored in the first storage tier is reduced. At some point in time, the data chunks corresponding to "A," "B," "C," and "D" will become unreferenced. Those data chunks may be deleted by a garbage collection process.

Storage system 112 may periodically (e.g., weekly) perform the technique to deduplicate the metadata that enables the backed up data associated with a primary system to be located. In some embodiments, storage system 112 performs the technique after a threshold amount of data has been backed up to storage system 112 since the technique was previously performed.

Figure 2A:
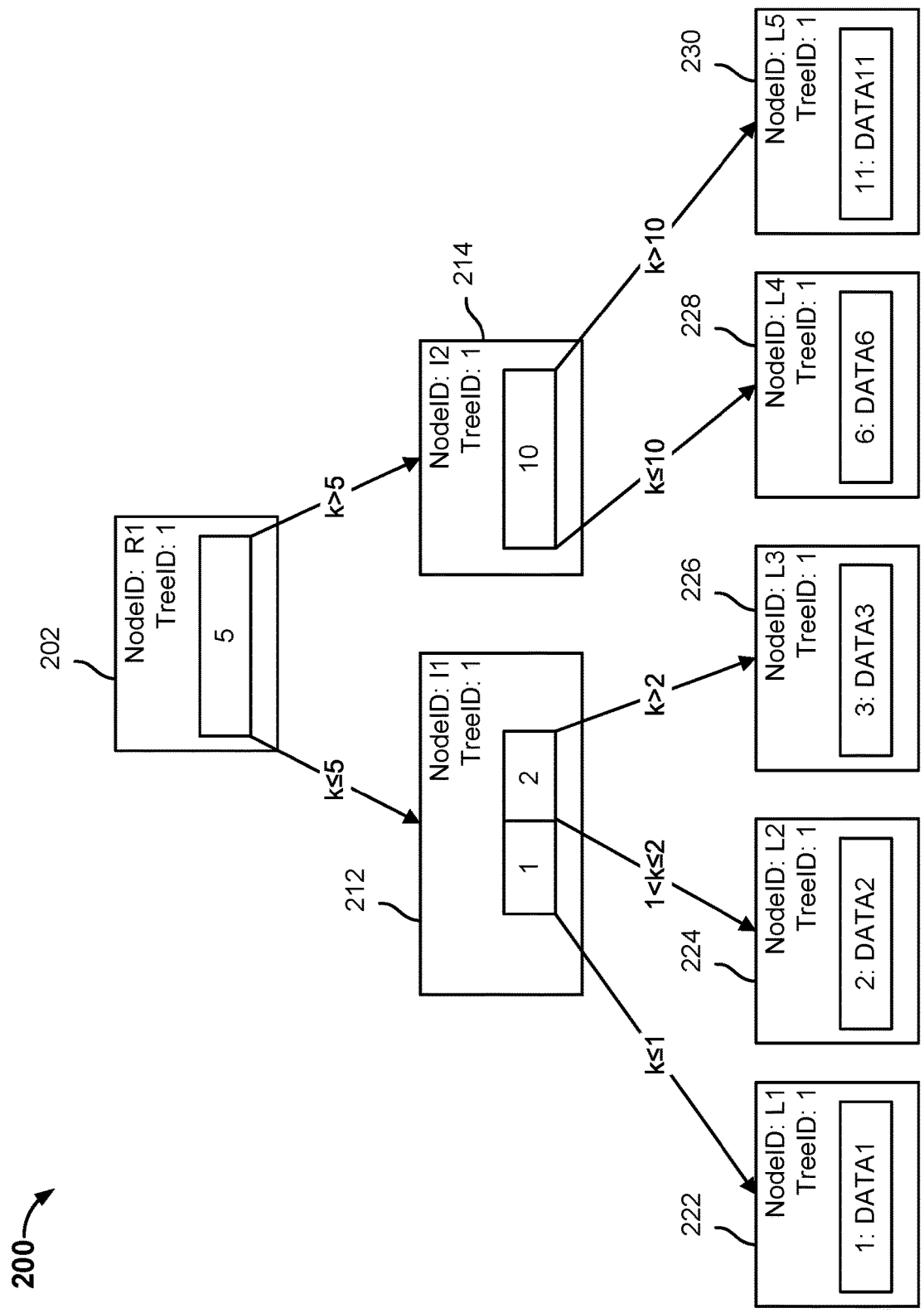
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as storage system 112. A file system manager, such as file system manager 117, may generate tree data structure 200. Tree data structure 200 may correspond to a full backup.

Tree data structure 200 is comprised of a snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup of file system data at a particular point in time, for example, at time t0. The backup may be received from a primary system, such as primary system 102. The snapshot tree in conjunction with a plurality of object metadata structures may provide a complete view of the primary system associated with the backup for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node of the snapshot tree at the lowest level. Each node of the tree structure includes a node identifier (e.g., NodeID) that identifies the name of the node and a view identifier of a view with which the node is associated (e.g., TreeID). A leaf node may be configured to store key-value pairs of file system data. A data key k is a lookup value by which a particular leaf node may be accessed. For example, "1" is a data key that may be used to lookup "DATA1" of leaf node 222.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key.

In the example shown, root node 202 includes pointers to intermediate nodes 212, 214. Root node 202 includes a NodeID of "R1" and a TreeID of "1." When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf nodes 222, 224, 226, 228, 230 respectively store the data key-value pairs of "1: DATA1," "2:DATA2," "3:DATA3," "6:DATA6," and "11:DATA11." Leaf nodes 222, 224, 226, 228, 230 respectively have NodeIDs of "L1," "L2," "L3," "L4," and "L5." Each of the leaf nodes 222, 224, 226, 228, 230 have TreeIDs of "1." Leaf nodes 222, 224, 226, 228, 230 may store metadata, data when the size of the object is less than or equal to a limit size, or a pointer to or an identifier of an object metadata structure. An object metadata structure may correspond to a virtual machine disk image file backup.

Figure 2B:
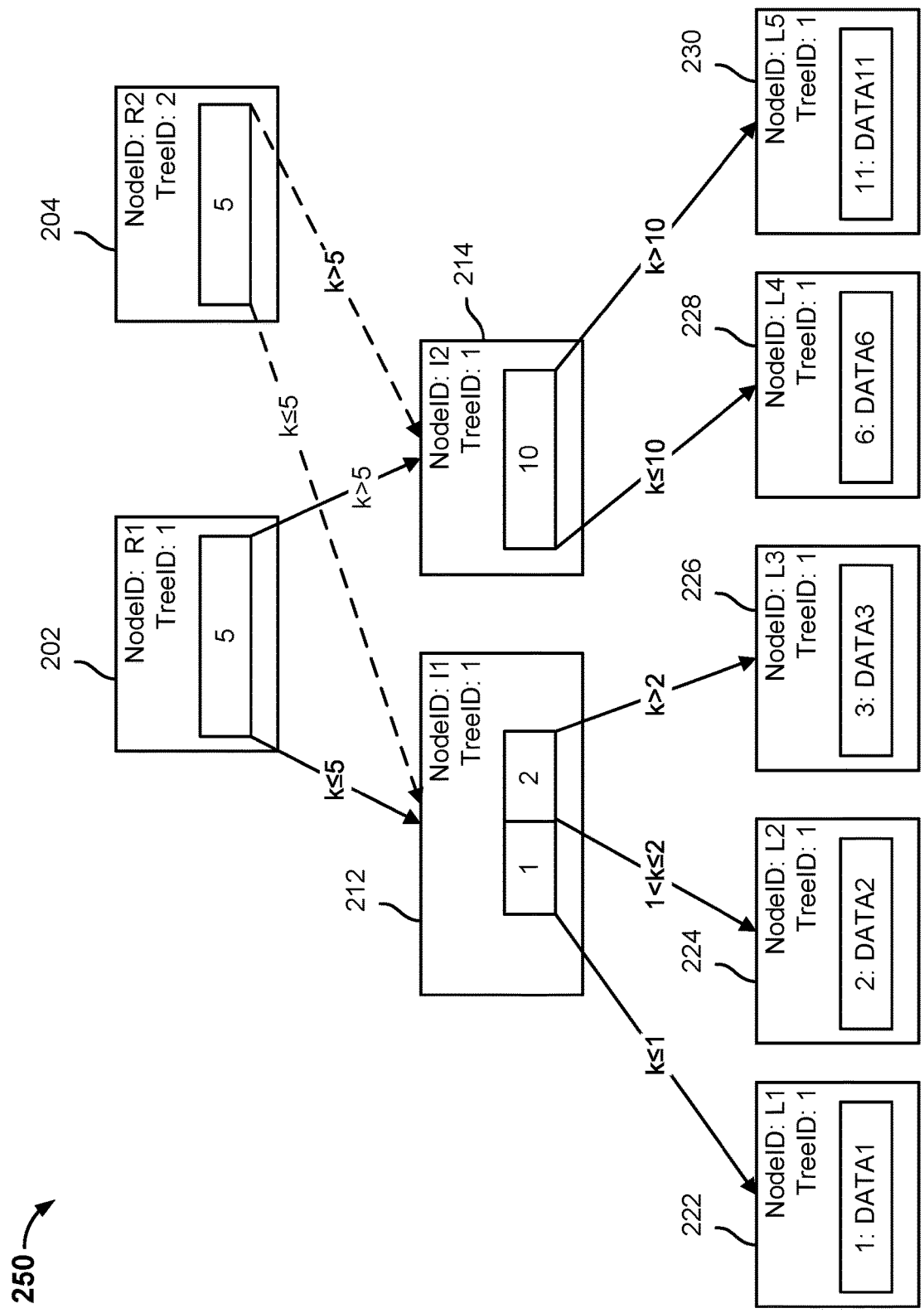
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure (e.g., when an incremental backup is performed), when data associated with a snapshot tree is migrated, when data associated with a snapshot tree is restored, when data associated with a snapshot tree is replicated, when data associated with a snapshot tree is used for test/development purposes, when data associated with a snapshot tree is to be updated, etc. In some embodiments, tree data structure 250 may be created by a storage system, such as storage system 112. The file system data of a primary system, such as primary system 102, may be backed up to a storage system, such as storage system 112. A subsequent backup may correspond to an incremental backup. The tree data structure corresponding to the subsequent backup is generated in part by cloning a snapshot tree associated with a previous backup.

In some embodiments, the snapshot tree corresponds to a virtual machine disk image file backup. One or more updates may be applied to the virtual machine disk image file backup by cloning the file system metadata snapshot tree that corresponds to the virtual machine disk image file backup.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure.

In some embodiments, the tree data structure allows a chain of backup versions (i.e., snapshot forest) to be linked together by allowing a node of a later version of a snapshot tree to reference a node of a previous version of a metadata snapshot tree. For example, a snapshot tree with root node 204 is linked to a snapshot tree with root node 202. Each time a backup is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a snapshot view of the file system data. A snapshot view may represent a state of the file system data at a particular moment in time in the past and is not updated. In the example shown, root node 202 is associated with a snapshot view of the file system data. In some embodiments, a root node is associated with a current view of the file system data. A current view may still accept one or more changes to the data. In the example shown, root node 204 is associated with a current view of the file system data.

To generate a snapshot tree corresponding to an incremental backup at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212 and a second set of pointers to intermediate node 214. Root node 204 includes a NodeID of "R2" and a TreeID of "2."

Figure 2C:
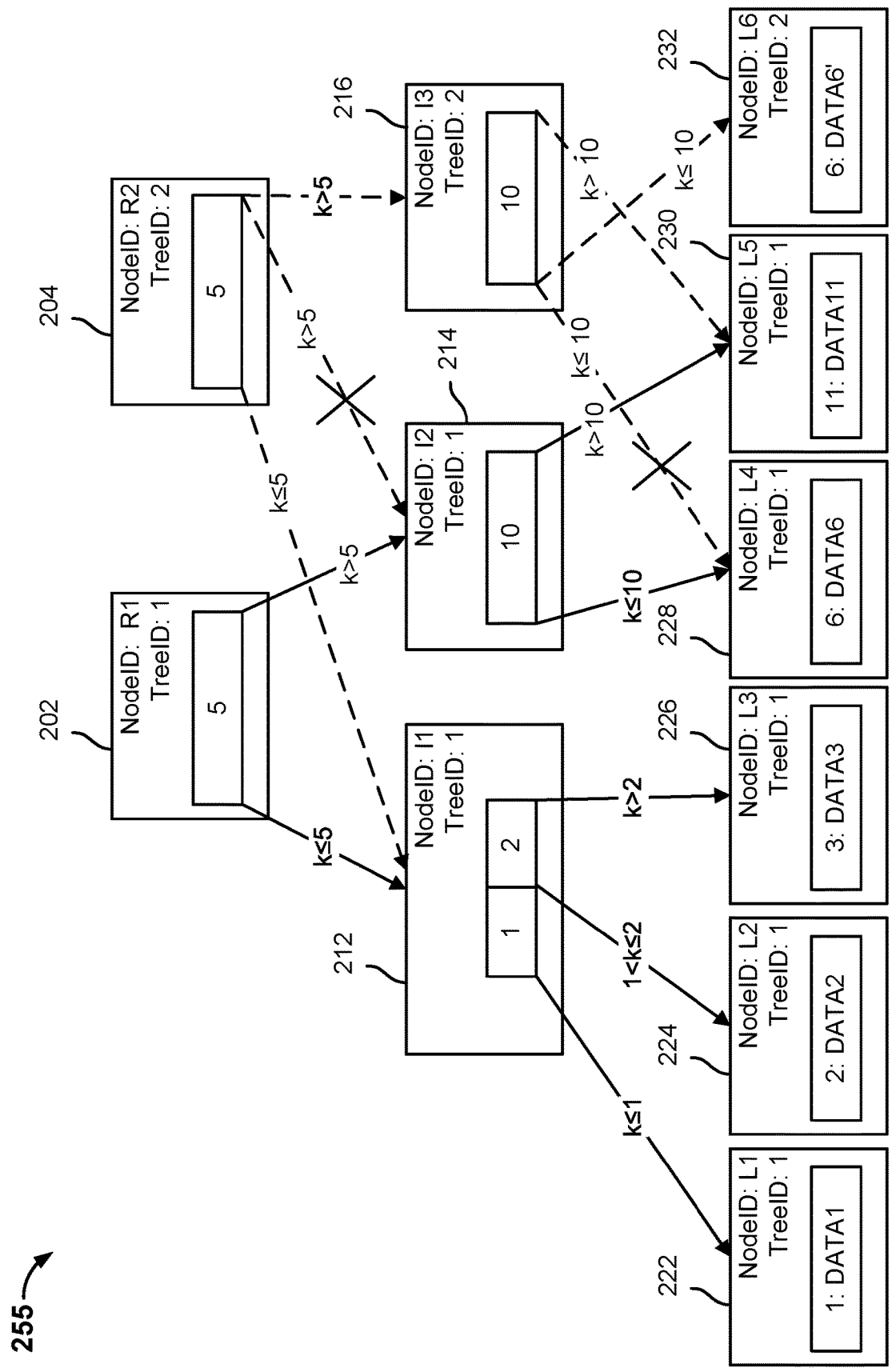
FIG. 2C is a block diagram illustrating an embodiment of modifying a cloned snapshot tree.

FIG. 2C is a block diagram illustrating an embodiment of modifying a cloned snapshot tree. In the example shown, tree data structure 255 may be modified by a file system manager, such as file system manager 117. A snapshot tree with a root node 204 may be a current view of the file system data, for example, at time $t_1$.

In the example shown, the value "DATA6" has been modified to be "DATA6'." In some embodiments, the value of a key value pair has been modified. In other embodiments, the value of the key value pair points to a different object metadata structure (e.g., an object metadata structure corresponding to a different version of an object). The different object metadata structure may be a modified version of the object metadata structure to which the leaf node previously pointed.

To modify the snapshot tree at $t_1$, the file system manager starts at root node 204 because that is the root node associated with the snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made.

A shadow copy of a node is performed when the node is included in a plurality of snapshot trees (e.g., the snapshot tree with root node 202 and the snapshot tree with root node 204) and a value stored by the node has been updated. The value stored by a node that is associated with a snapshot tree that corresponds to a previous backup is immutable. The shadow copy of the node enables a value stored by a node to be updated because the shadow copy of the node is not shared with one or more snapshot trees that correspond to one or more previous backups, rather, the shadow copy of the node is associated with the cloned snapshot tree.

A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228, i.e., a shadow copy. Leaf node copy 232 stores the modified value "DATA6" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In some embodiments, leaf node 232 stores the modified data associated with an object that is smaller than or equal to a limit size. In some embodiments, leaf node 232 stores a pointer to a different object metadata structure.

Figure 2D:
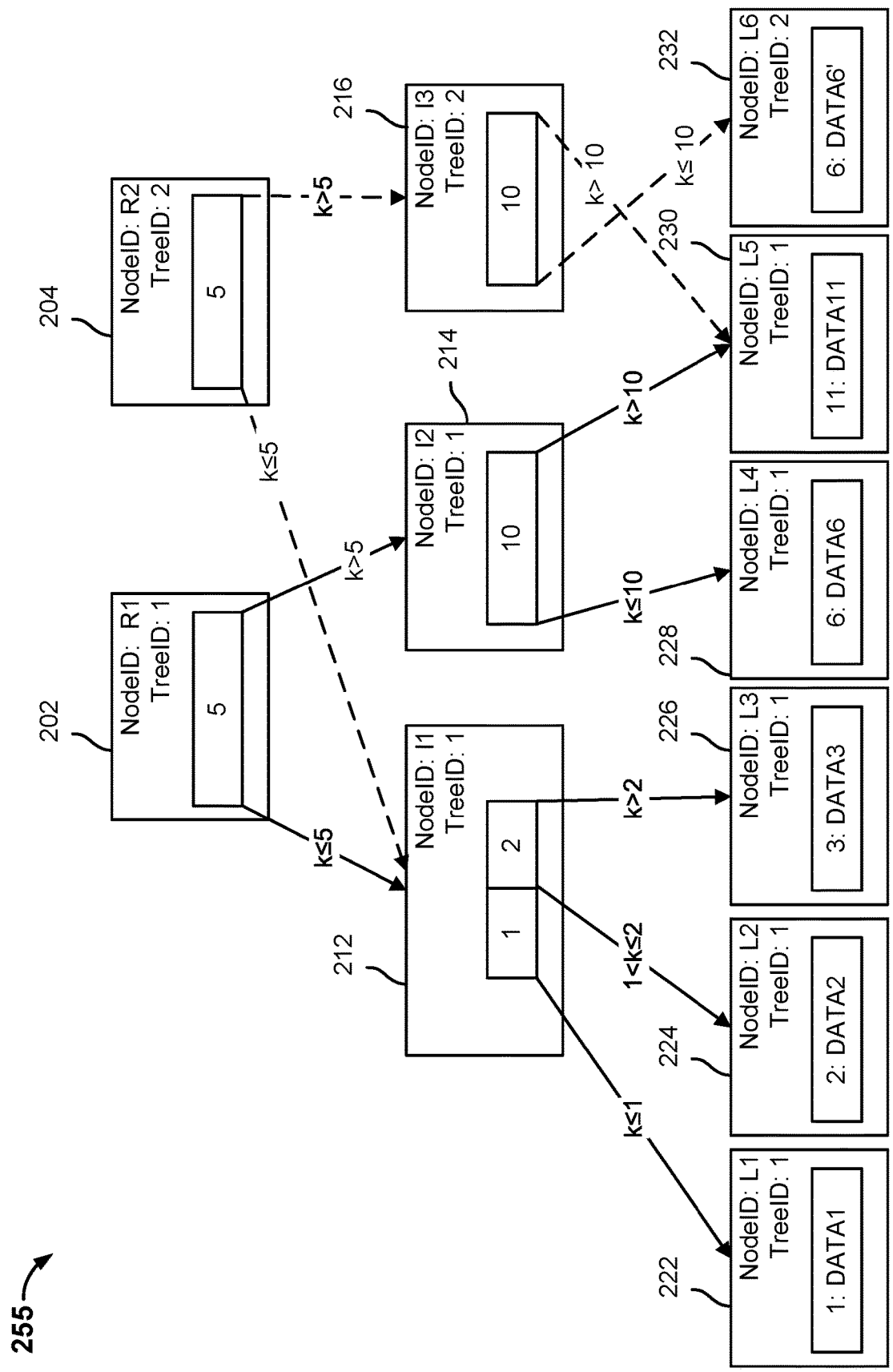
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
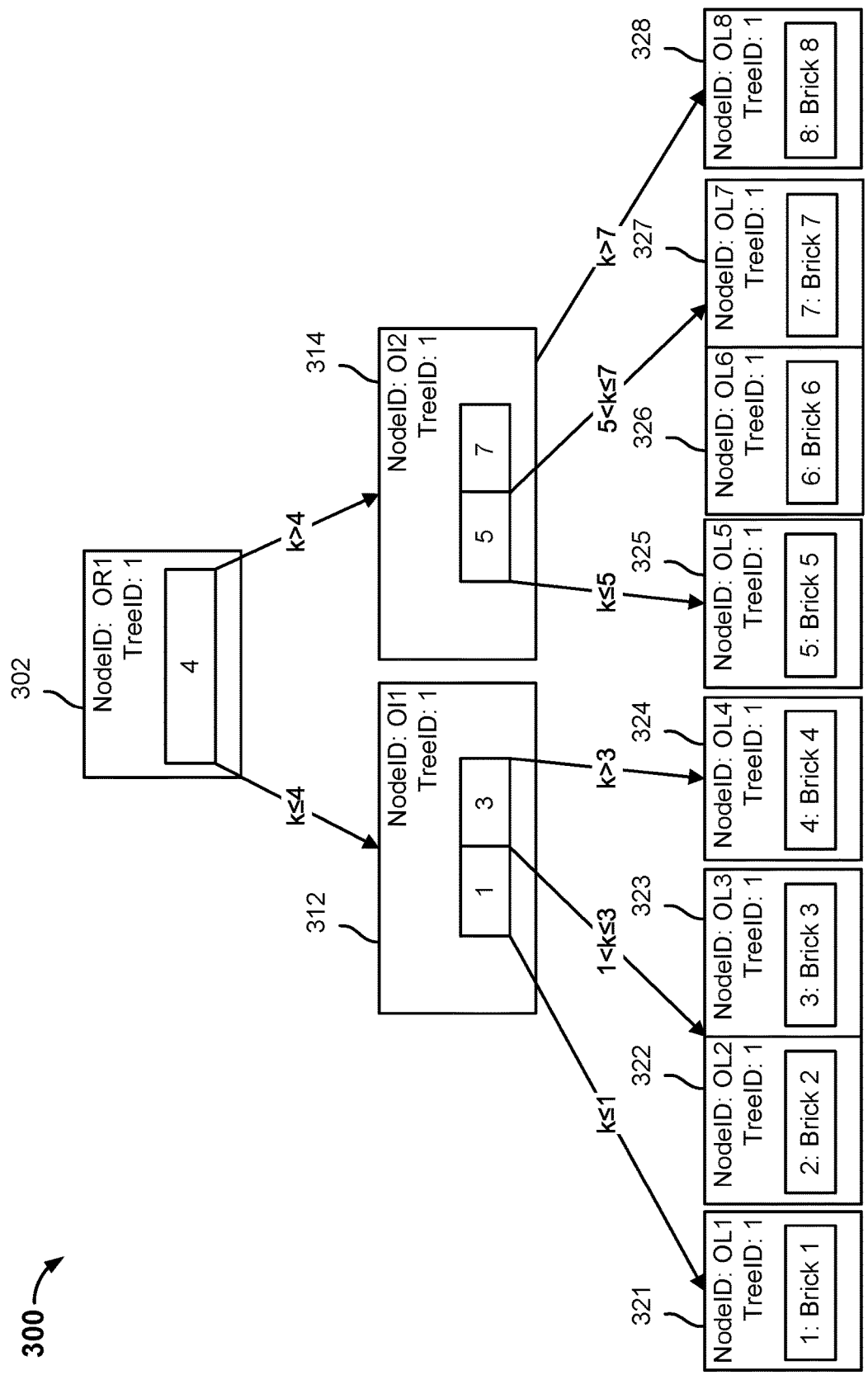
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. Tree data structure 300 may be used to store the metadata associated with an object metadata structure, which may be used to locate the data associated with an object. Tree data structure 300 may be referred to as an "object metadata structure" or an "object metadata tree." In the example shown, tree data structure 300 corresponds to an object, such as a virtual machine disk image file backup, and stores the metadata associated with the object. The metadata associated with an object may be stored by a storage system separate from the contents of the object, that is, the tree data structure storing the metadata associated with an object is stored separately from the contents of the object. For example, the contents of the object may be stored on a hard disk drive, while tree data structure 300 that holds the object metadata may be stored in storage with faster access times, such as a solid state drive (SSD) of a storage node.

A leaf node of a snapshot tree associated with file system data, such as a leaf node of tree data structures 200, 250, 255, may include a pointer to a root node of a tree data structure that stores metadata corresponding to an object, such as tree data structure 300. A tree data structure corresponding to an object at a particular point in time (e.g., a particular version) may be comprised of a root node, one or more levels of one or more intermediate nodes, and one or more leaf nodes. Tree data structure 300 may be a snapshot of an object at a particular point in time t, for example at time $t_0$. Tree data structure 300 may correspond to a full backup of an object, such as a full backup of a virtual machine disk image file.

In the example shown, tree data structure 300 includes object root node 302, object intermediate nodes 312, 314, and object leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the object). Root node 302 includes pointers to intermediate nodes 312, 314. Root node 302 includes a NodeID of "OR1" and a TreeID of "1."

In the example shown, intermediate node 312 includes respective pointers to leaf nodes 321, 322, 323, 324. Intermediate node 312 includes a NodeID of "OI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "OI2" and a TreeID of "1." Intermediate node 314 includes a first node key and a second node key. The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of an object corresponding to tree data structure 300. Leaf node 321 includes NodeID of "OL1" and a TreeID of "1."

Leaf node 322 includes a data key-value pair of "2: Brick 2." "Brick 2" is a brick identifier that identifies the data brick associated with one or more data chunks of an object corresponding to tree data structure 300. Leaf node 322 includes NodeID of "OL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of an object corresponding to tree data structure 300. Leaf node 323 includes NodeID of "OL3" and a TreeID of "1."

Leaf node 324 includes a data key-value pair of "4: Brick 4." "Brick 4" is a brick identifier that identifies the data brick associated with one or more data chunks of an object corresponding to tree data structure 300. Leaf node 324 includes NodeID of "OL4" and a TreeID of "1."

Leaf node 325 includes a data key-value pair of "5: Brick 5." "Brick 5" is a brick identifier that identifies the data brick associated with one or more data chunks of an object corresponding to tree data structure 300. Leaf node 325 includes NodeID of "OL5" and a TreeID of "1."

Leaf node 326 includes a data key-value pair of "6: Brick 6." "Brick 6" is a brick identifier that identifies the data brick associated with one or more data chunks of an object corresponding to tree data structure 300. Leaf node 326 includes NodeID of "OL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of an object corresponding to tree data structure 300. Leaf node 327 includes NodeID of "OL7" and a TreeID of "1."

Leaf node 328 includes a data key-value pair of "8: Brick 8." "Brick 8" is a brick identifier that identifies the data brick associated with one or more data chunks of an object corresponding to tree data structure 300. Leaf node 328 includes NodeID of "OL8" and a TreeID of "1."

An object is comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 114, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
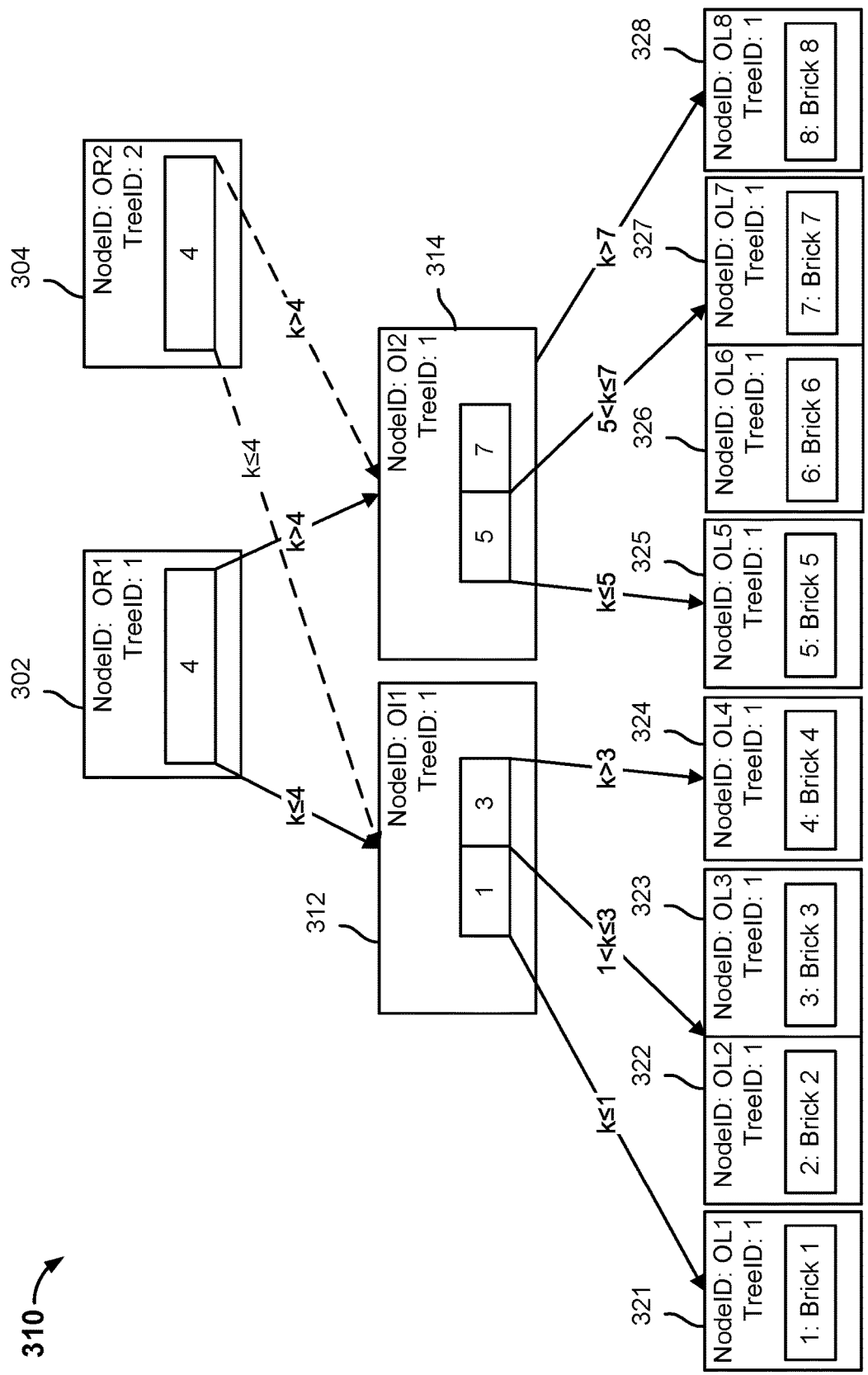
FIG. 3B is a block diagram illustrating an embodiment of a cloned object metadata structure.

FIG. 3B is a block diagram illustrating an embodiment of a cloned object metadata structure. An object metadata structure may be cloned when a subsequent version of an object is stored on a storage system. In some embodiments, tree data structure 310 may be created by a storage system, such as storage system 112. In the example shown, tree data structure 310 corresponds to an object that is a snapshot tree, but stores metadata associated with the object that enables the data associated with the object to be located. The tree data structure corresponding to an object can be used to capture different versions of an object at different moments in time. The tree data structure allows a chain of object metadata structures corresponding to different versions of an object to be linked together by allowing a node of a later version of an object metadata structure to reference a node of a previous version of an object metadata structure. The object metadata structure corresponding to a subsequent version of an object may be generated in part by cloning the object metadata structure corresponding to a previous version of an object.

A root node or an intermediate node of a version of an object metadata structure may reference an intermediate node or a leaf node of a previous version of an object metadata structure. Similar to the snapshot tree, the object metadata structure allows different versions of an object to share nodes and allows changes to an object to be tracked. When a backup is received, a root node of the object metadata structure may be linked to one or more intermediate nodes associated with a previous object metadata structure. This may occur when data associated with an object is included in both backups.

In the example shown, tree data structure 310 includes a first object metadata structure comprising root node 302, intermediate nodes 312, 314, and leaf nodes 321, 322, 323, 324, 325, 326, 327, 328. Tree data structure 310 also includes a second object metadata structure that may be a snapshot of object data at a particular point in time, for example at time $t_1$. The second object metadata structure is comprised of root node 304, intermediate nodes 312, 314, and leaf nodes 321, 322, 323, 324, 325, 326, 327, 328.

To create a snapshot of the object data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the object metadata structure at a particular moment in time. The TreeID of a root node indicates a view with which the root node is associated (e.g., object file version). For example, root node 302 with a TreeID of "1" is associated with a first backup and root node 304 with a TreeID of "2" is associated with a second backup.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing an object metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing an object metadata structure included in tree data structure 310 from root node 304 to intermediate node 314 leads to a leaf node with a data key of "5," "6," "7," or "8." Root node 304 includes a NodeID of "OR2" and a TreeID of "2."

Figure 3C:
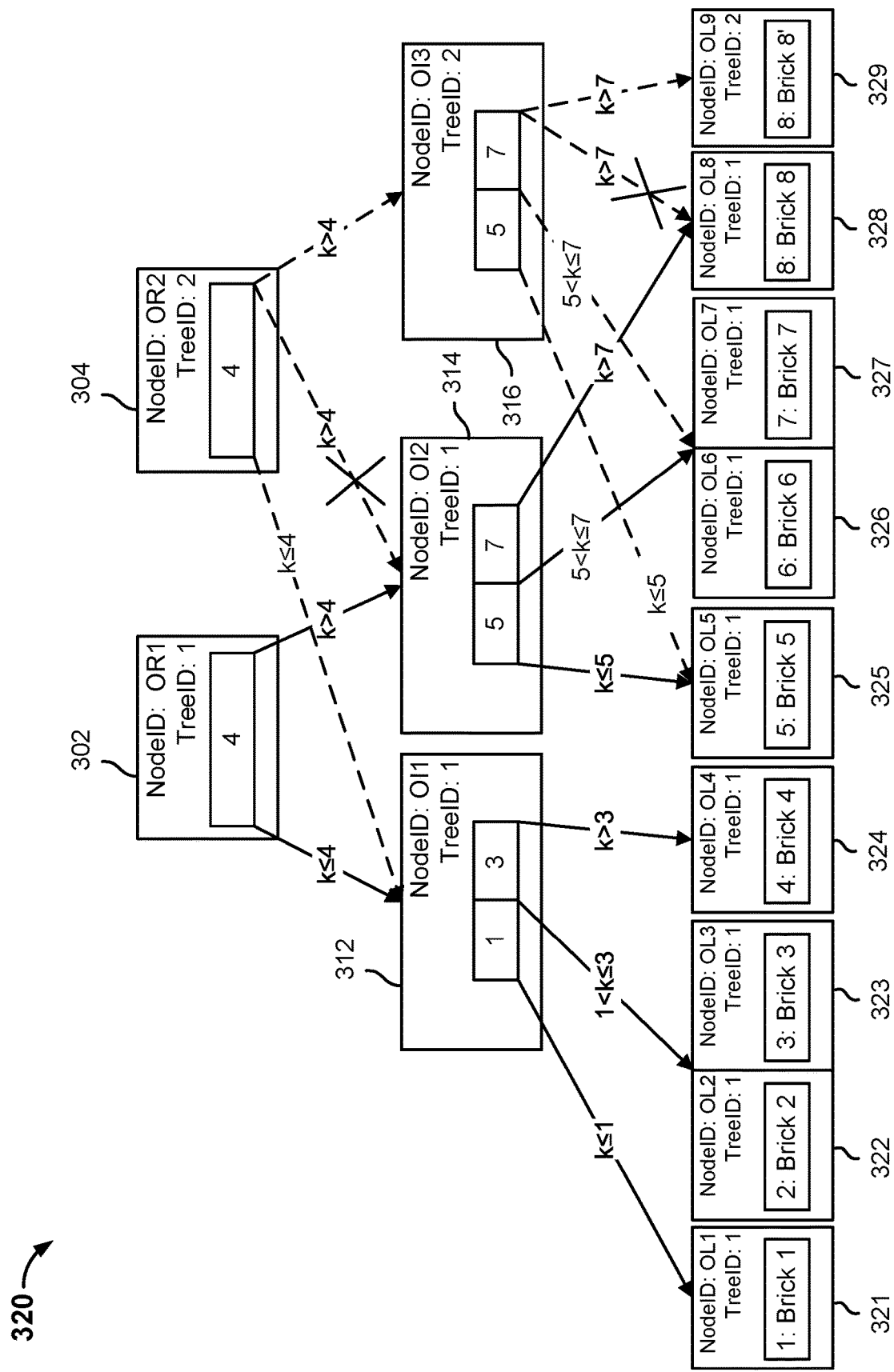
FIG. 3C is a block diagram illustrating an embodiment of modifying a cloned object metadata structure.

FIG. 3C is a block diagram illustrating an embodiment of modifying a cloned object metadata structure. Tree data structure 320 is comprised of a first object metadata structure that includes root node 302 and a second object metadata structure that includes root node 304. In the example shown, tree data structure 320 may be modified by a file system manager, such as file system manager 117.

In some embodiments, the data associated with an object may be modified such that one of the data chunks is replaced by another data chunk to represent the modification. For example, an update applied to a virtual machine disk image file may change a data chunk of the virtual machine disk image file. When a data chunk of an object associated with a previous backup is replaced with a new data chunk, the data brick associated with the new data chunk may be different. A leaf node of an object metadata structure stores a brick identifier of a data brick that is associated with a data chunk. To represent this modification to the object data, a corresponding modification is made to a current view of an object metadata structure. The current view of the object metadata structure is modified because the previous object metadata structure is a snapshot view and can no longer be modified. The data chunk of the object data that was replaced has a corresponding leaf node in the previous object metadata structure. A new leaf node in the current view of the object metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the object metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
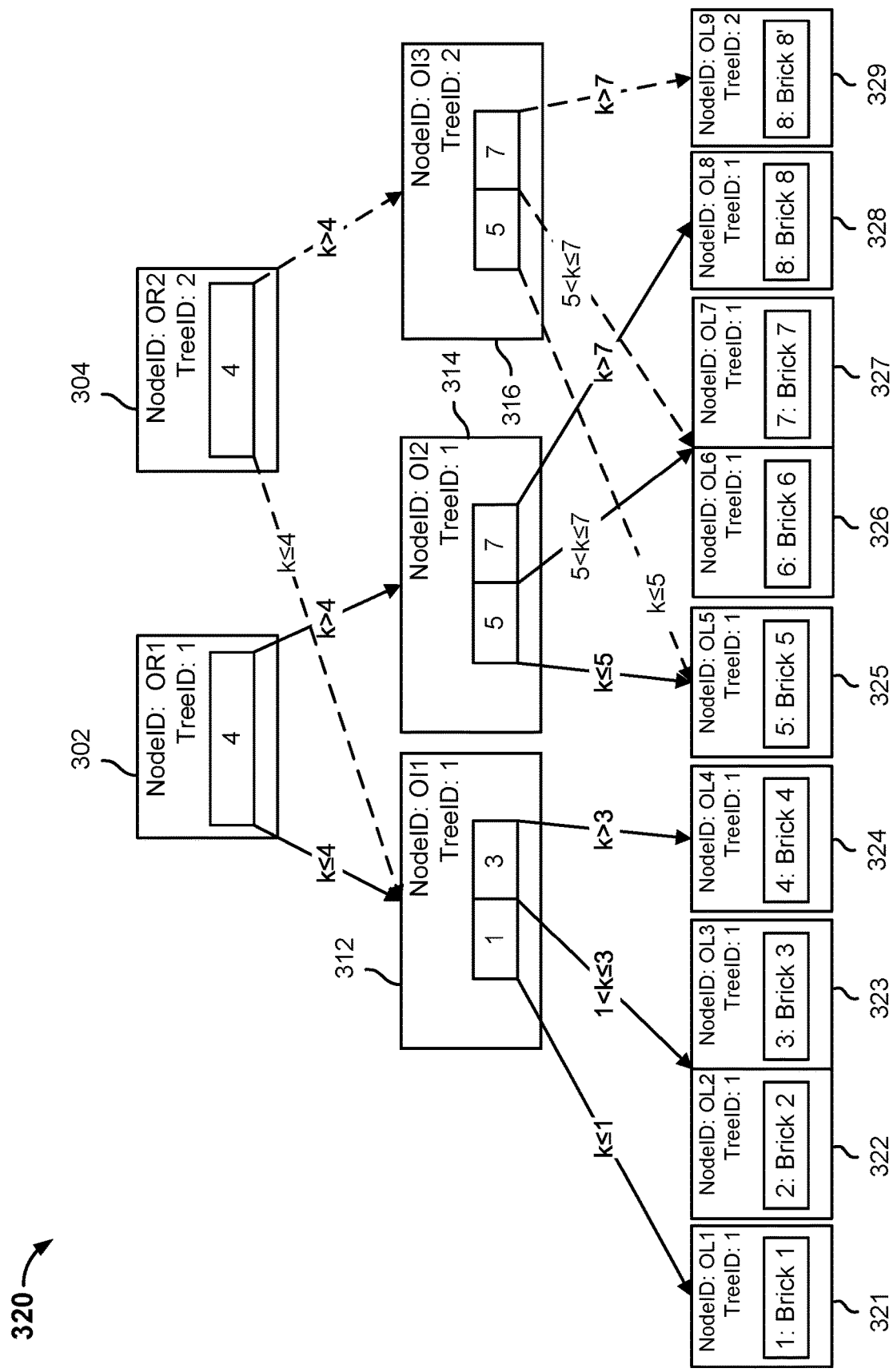
FIG. 3D is a block diagram illustrating an embodiment of a modified object metadata structure.

FIG. 3D is a block diagram illustrating an embodiment of a modified object metadata structure. The tree data structure 320 shown in FIG. 3D illustrates a result of the modifications made to tree data structure 310 as described with respect to FIG. 3C.

Figure 4:
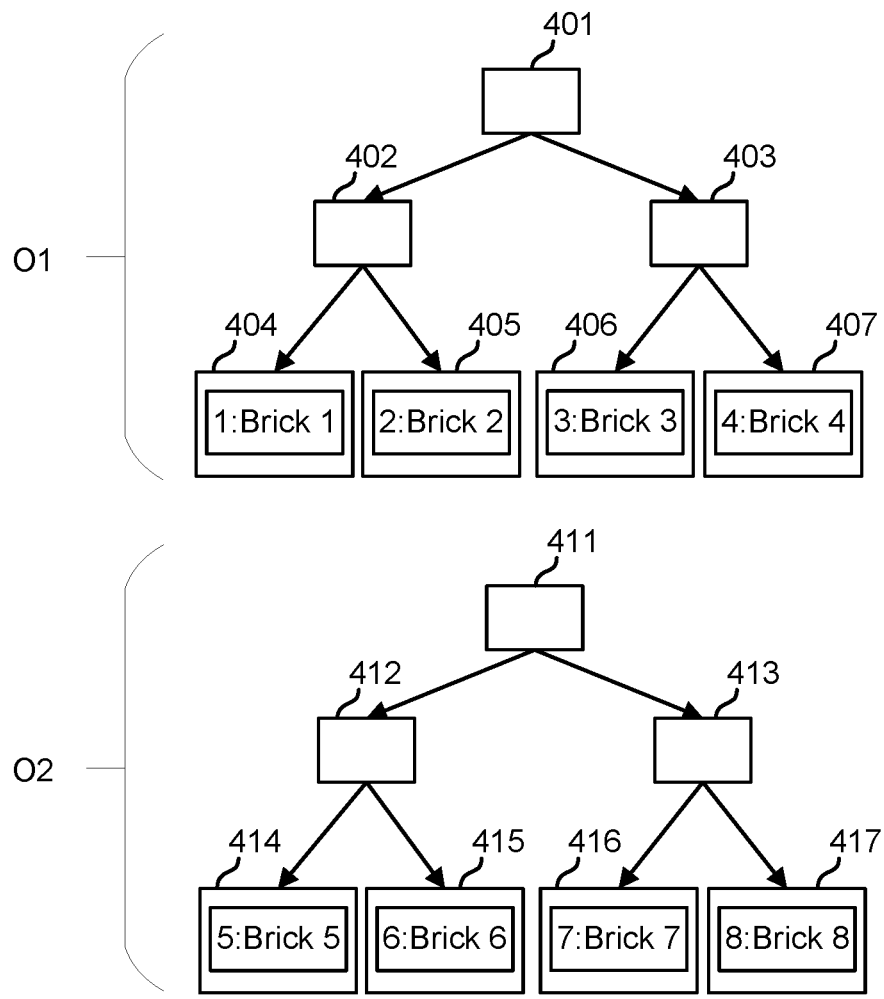
FIG. 4 is a diagram illustrating examples of object metadata structures in accordance with some embodiments.

FIG. 4 is a diagram illustrating examples of object metadata structures in accordance with some embodiments. In the example shown, object metadata structures 400 include a first object metadata structure "O1" and a second object metadata structure "O2."

The first object metadata structure "O1" includes a root node 401, intermediate nodes 402, 403, and leaf nodes 404, 405, 406, 407. Root node 401 has a NodeID of "OR1," intermediate node 402 has a NodeID of "OI1," intermediate node 403 has a NodeID of "OI2," leaf node 404 has a NodeID of "OL1," leaf node 405 has a NodeID of "OL2," leaf node 406 has a NodeID of "OL3," and leaf node 407 has a NodeID of "OL4."

The second object metadata structure "O2" includes a root node 411, intermediate nodes 412, 413, and leaf nodes 414, 415, 416, 417. Root node 411 has a NodeID of "OR2," intermediate node 412 has a NodeID of "OI3," intermediate node 413 has a NodeID of "OI4," leaf node 414 has a NodeID of "OL5," leaf node 415 has a NodeID of "OL6," leaf node 416 has a NodeID of "OL7," and leaf node 417 has a NodeID of "OL8."

Leaf node 404 stores a value of a content identifier structure "Brick 1," leaf node 405 stores a value of a content identifier structure "Brick 2," leaf node 406 stores a value of a content identifier structure "Brick 3," and leaf node 407 stores a value of a content identifier structure "Brick 4." A content identifier structure may be associated with one or more data chunks.

Leaf node 414 stores a value of a content identifier structure "Brick 5," leaf node 415 stores a value of a content identifier structure "Brick 6," leaf node 416 stores a value of a content identifier structure "Brick 7," and leaf node 417 stores a value of a content identifier structure "Brick 8."

FIG. 5A is a diagram illustrating a data structure in accordance with some embodiments. Data structure 500 may be stored by a storage system, such as storage system 112, in a metadata store, such as metadata store 114. Data structure 500 may correspond to a chunk metadata table. In the example shown, data structure 500 stores the information associated with tree data structures 400. For example, data structure 500 stores information about a node, such as "ObjectID," "NodeID," "ChildrenID," "Ref Count," "Content Identifier Structure," "ChunkID(s)," and "Chunk FileID."

The "ObjectID" value identifies a view of data to which the node is originally associated. For example, a view of data may be generated by a storage system. An "ObjectID" of "1" indicates that a node was generated when the storage system generated a view of data associated with an "ObjectID" of "1." The "NodeID" value identifies a name of a node. The "ChildrenID" value identifies the one or more children nodes to which the node points. The "Ref Count" value is a reference count that indicates a number of nodes that point to the node. The "Content Value Structure" value is a value stored by a leaf node. The "ChunkID(s)" values are chunk identifier(s) associated with a content identifier structure. The "Chunk FileID" value indicates the one or more chunk files to which the chunk identifier(s) are associated.

A storage system may store a version of data structure 500 for each view generated by the storage system. In some embodiments, data structure 500 stores information for all of the views generated by the storage system. A storage system may traverse data structure 500 to determine which data chunks are associated with a view of data. The storage system may traverse data structure 500 to identify potential chunk identifier sequence(s) that may be common to a plurality of entries.

In the example shown, the storage system may traverse data structure 500 to determine that data chunks having chunk identifiers "A," "B," "C," "D," "E", and "F" are associated with "Brick 1," data chunks having chunk identifiers "G," "H," "I," "J," and "K" are associated with "Brick 2," data chunks having chunk identifiers "L," "M," "N," "O," and "P" are associated with "Brick 3," data chunks having chunk identifiers "Q)," "R," "X," and "Y" are associated with "Brick 4," data chunks having chunk identifiers "A," "B," "C," "D," "E," and "X" are associated with "Brick 5," data chunks having chunk identifiers "H," "Y," "I," "J," and "K" are associated with "Brick 6," data chunks having chunk identifiers "K," "E," "M," "B," and "A" are associated with "Brick 7," and data chunks having chunk identifiers "P," "A," "D," and "Y" are associated with "Brick 8." Each of the chunk identifiers may correspond to an SHA-1 hash value.

A storage system may determine a chunk identifier marker for a chunk identifier sequence by performing a modulo operation to determine a modulus value for each chunk identifier included in the chunk identifier sequence. A chunk identifier may be determined to be a candidate as a chunk identifier marker for the chunk identifier sequence in the event the determined modulus value for the chunk identifier is zero.

The storage system may determine potential chunk identifier sequences for an object based on the candidate chunk identifier markers. The storage system may determine a common chunk identifier sequence within a particular offset range of an object. In some embodiments, the particular offset range corresponds to a single content identifier structure. In some embodiments, the particular offset range corresponds to a plurality of content identifier structures of an object.

In this example, the particular offset range corresponds to the offset ranges associated with "Brick 1" and "Brick 2" of a first object, and the offset ranges associated with "Brick 5" and "Brick 6" of a second object. The storage system may determine modulus values for each of the chunk identifiers associated with "Brick 1," "Brick 2," "Brick 5," and "Brick 6." The storage system determines that the chunk identifiers "D," "I," "K," and X" are candidate chunk identifier markers. As a result, the potential common sequences of chunk identifiers for the first object may be "ABCD, "EFGHI," and "JK", and the potential common sequences of chunk identifiers for the second object may be "ABCD," "HYI," and "JK." The common sequences of chunk identifiers that are shared between the first and second objects are "ABCD" and "JK."

FIG. 5B is a diagram illustrating a data structure in accordance with some embodiments. Data structure 550 may correspond to a chunk file metadata table. Data structure 550 may be stored in a metadata store, such as metadata store 114. In the example shown, data structure 550 is configured to associate a chunk file identifier with a chunk identifier (e.g., SHA-1 hash-value), a chunk file offset, a storage node, a primary owner, and a secondary owner, if applicable. A storage system may use data structure 500 in conjunction with data structure 550 to locate data chunks associated with an object.

A chunk file is comprised of a plurality of data chunks. Data structure 550 may indicate the plurality of data chunks associated with a chunk file. Data structure 550 may also indicate corresponding locations of the data chunks within the chunk file. For example, data structure 550 indicates that a chunk file having a chunk file identifier of "Chunk File 1" is comprised of at least a first data chunk having a chunk identifier of "A," a second data chunk having a chunk identifier of "B," a third data chunk having a chunk identifier of "C," and a fourth data chunk having a chunk identifier of "D." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 550 indicates that a chunk file having a chunk file identifier of "Chunk File 2" is comprised of at least a first data chunk having a chunk identifier of "E," a second data chunk having a chunk identifier of "F," a third data chunk having a chunk identifier of "G," and a fourth data chunk having a chunk identifier of "H." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 550 indicates that a chunk file having a chunk file identifier of "Chunk File 3" is comprised of at least a first data chunk having a chunk identifier of "I," a second data chunk having a chunk identifier of "J," a third data chunk having a chunk identifier of "K," and a fourth data chunk having a chunk identifier of "L." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 550 indicates that a chunk file having a chunk file identifier of "Chunk File 4" is comprised of at least a first data chunk having a chunk identifier of "M," a second data chunk having a chunk identifier of "N," a third data chunk having a chunk identifier of "O," and a fourth data chunk having a chunk identifier of "P." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 550 indicates that a chunk file having a chunk file identifier of "Chunk File 5" is comprised of at least a first data chunk having a chunk identifier of "Q," a second data chunk having a chunk identifier of "R," a third data chunk having a chunk identifier of "X," and a fourth data chunk having a chunk identifier of "Y." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

A storage system comprised of a plurality of storage nodes may store redundant copies of a chunk file across the nodes. This may ensure access to the chunk file in the event a storage node of the storage system goes offline. In the example shown, a chunk file having a chunk file identifier of "Chunk File 1" is stored on storage node 1 and storage node 3, a chunk file having a chunk file identifier of "Chunk File 2" is stored on storage node 2 and storage node 4, a chunk file having a chunk file identifier of "Chunk File 3" is stored on storage node 2 and storage node 3, a chunk file having a chunk file identifier of "Chunk File 4" is stored on storage node 3 and storage node 4, and a chunk file having a chunk file identifier of "Chunk File 5" is stored on storage node 1 and storage node 4.

A chunk file may be associated with a primary owner. The primary owner may correspond to the original object metadata structure that includes references to the data chunks included in the chunk file. For example, a primary system may perform a first backup that includes a first object and send the data associated with the first object to a storage system. The storage system may generate and store the data associated with the first object in one or more chunk files. The storage system may generate a first object metadata structure corresponding to the first object. In other embodiments, the primary owner corresponds to the original object that is associated with the chunk file.

The primary system may perform a second backup that includes a second object (e.g., a new object) and send the data associated with the second object to the storage system. Some of the data associated with the second object (e.g., data chunks) may already be stored on the storage system. Instead of generating a second chunk file for the duplicate data, the storage system may generate a second object metadata structure corresponding to the second object and the second object metadata structure may include one or more references to the one or more chunk files associated with the first object. The second object metadata structure may be considered to be a secondary owner. In the example shown, the object metadata structure corresponding to "Object 1" is the primary owner of chunk files 1, 2, 3, 4, 5 and the metadata structure corresponding to "Object 2" is the secondary owner of chunk files 1 and 3, and portions of chunk files 2, 4, 5. In some embodiments, the number of references associated with a data chunk may be determined based on the primary and secondary owners.

FIG. 6A is a diagram illustrating a data structure in accordance with some embodiments. Data structure 600 may be stored by a storage system, such as storage system 112, in a metadata store, such as metadata store 114. Data structure 600 corresponds to an updated version of data structure 500. Data structure 600 may be a chunk metadata table.

In the example shown, the storage system determined that the common sequences of chunk identifiers that are shared between the first and second objects are "ABCD" and "JK." The storage system uses a first storage tier (e.g., SSD) to store data structure 500. The amount of storage in the first storage tier is finite. Storing multiple instances of "ABCD" and "JK" is duplicative and an inefficient use of the first storage tier. The amount of storage needed to store data structure 500 may be reduced by updating common sequences of chunk identifiers that are shared between and/or within objects to reference corresponding common sequence identifiers. As seen in data structure 600, the entries for "Brick 1," "Brick 2," "Brick 5," and "Brick 6" have been updated to store "αEF," "GHIµ," "αEX," and "HYIµ," respectively. Each chunk identifier stored in an entry may be an SHA-1 hash value and be 20 bytes of data. Thus, updating a chunk sequence of "ABCD" and "JK" may save 60 bytes and 20 bytes of data, respectively.

A chunk metadata table may store a large number of entries (e.g., thousands, millions, etc.), some of which share common sequences of chunk identifiers. The amount of storage savings may be significant (e.g., MBs, GBs). Reducing the number of chunk identifiers stored in the chunk metadata table reduces the amount of storage space used by the storage system to store the chunk metadata table.

FIG. 6B is a diagram illustrating a data structure in accordance with some embodiments. Data structure 650 may correspond to a chunk file metadata table. Data structure 650 may be stored in a metadata store, such as metadata store 114.

For a common chunk identifier sequence that is common to more than a threshold number of entries, the storage system is configured to generate in a new chunk file a new data chunk corresponding to data chunks associated with the common chunk identifier sequence. In some embodiments, the threshold number of entries is 2. In some embodiments, the threshold number of entries is larger than 2 (e.g., 20). The threshold number of entries is a configurable number. The process of updating a chunk metadata table, chunk file metadata table, and creating new chunk files requires a certain amount of time and resources to perform. The storage system may perform other processes, such as backup, restore, replication, migration, etc., during this process. Thus, the threshold number of entries may be adjusted to balance the desired space savings with the time and resources required to achieve the desired space savings.

Data structure 650 is an updated version of data structure 550. The entries of data structure 550 from FIG. 5B are not shown for illustrative purposes, but data structure 650 includes those entries. "Chunk File 6" and "Chunk File 7" are new chunk files generated by the storage system. "Chunk File 6" stores the data chunks associated with chunk identifiers "A," "B," "C," and "D." The sequence of these chunk identifiers is associated with a common sequence identifier of "α." "Chunk File 7" stores the data chunks associated with chunk identifiers "J" and "K." The sequence of these chunk identifiers is associated with a common sequence identifier of "µ."

Data structure 650 indicates that a chunk file having a chunk file identifier of "Chunk File 6" is comprised of at least a first data chunk having a chunk identifier of "α" with a chunk file offset of "0-1024 kb." Data structure 650 indicates that a chunk file having a chunk file identifier of "Chunk File 7" is comprised of at least a first data chunk having a chunk identifier of "µ" with a chunk file offset of "0-512 kb."

Figure 7:
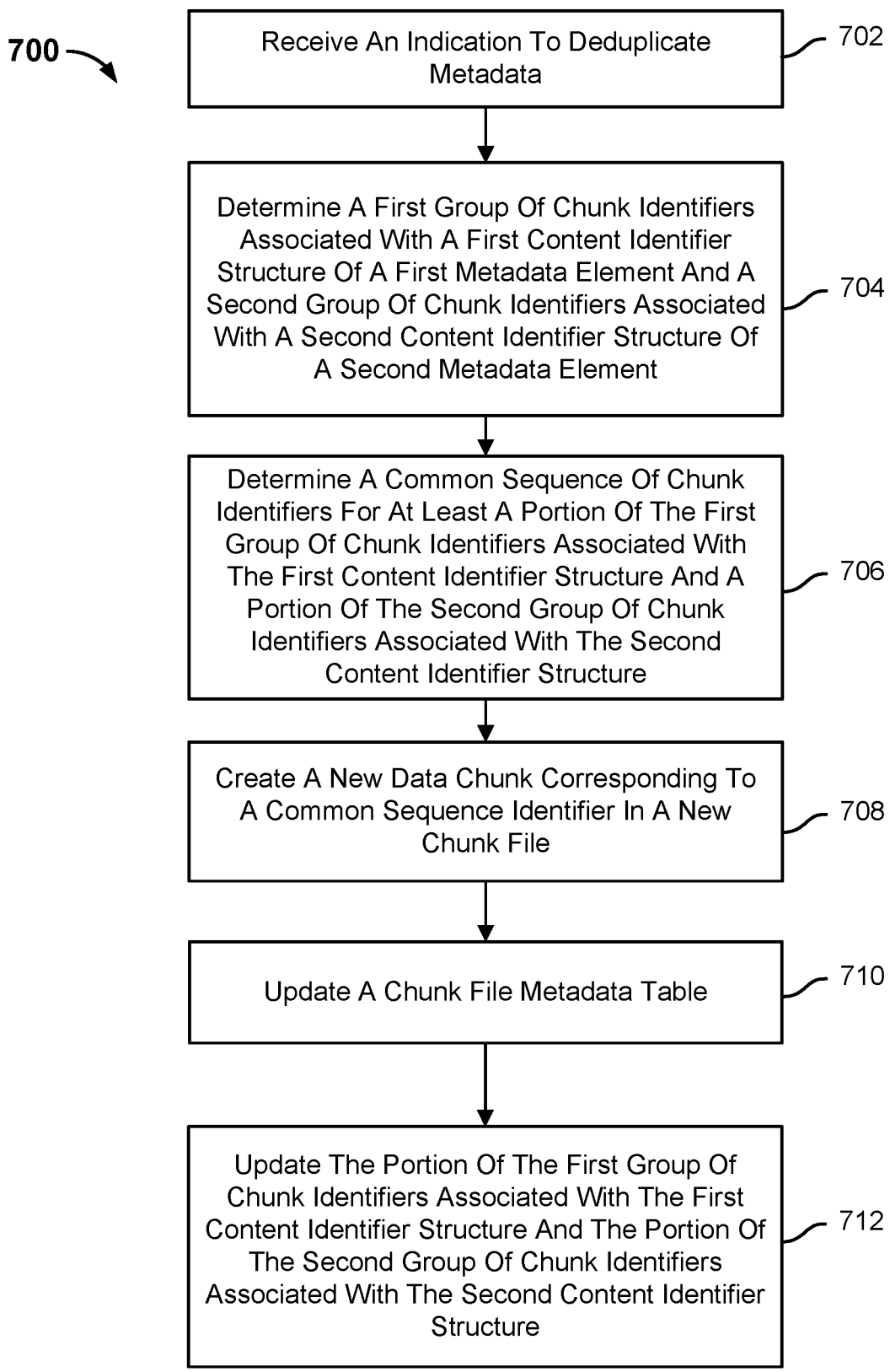
FIG. 7 is a flow diagram illustrating a process for deduplicating metadata in accordance with some embodiments.

FIG. 7 is a flow diagram illustrating a process for deduplicating metadata in accordance with some embodiments. In the example shown, process 700 may be implemented by a storage system, such as storage system 112.

At 702, an indication to deduplicate metadata is received. A storage system may store metadata that enables data associated with one or more objects to be located. The metadata may include tree data structures, a data structure that associates content identifier structures included in the tree data structures with chunk identifiers, and a data structure that associates chunk identifiers with chunk files.

In some embodiments, a storage system periodically deduplicates metadata. In some embodiments, the storage system deduplicates metadata after a threshold amount of new metadata has been generated.

At 704, a first group of chunk identifiers associated with a first content identifier structure of a first metadata element and a second group of chunk identifiers associated with a second content identifier structure of a second metadata element are determined.

A storage system stores one or more tree data structures. A tree data structure may correspond to a state of a primary system at a particular moment in time (e.g., a moment in time at which a backup is performed). Each of the one or more tree data structures includes one or more object metadata structures. An object metadata structure corresponds to a state of an object at a particular moment in time (e.g., a moment in time at which a backup is performed). An object metadata structure includes a plurality of metadata elements that are associated with corresponding content identifier structures. Each of the content identifier structures is associated with one or more corresponding chunk identifiers.

Chunk identifiers associated with the first content identifier structure of the first metadata element may be clustered into the first group and chunk identifiers associated with the second content identifier structure of the first metadata element may be clustered into the second group based on an object identifier and an offset range associated with an object. In some embodiments, the first metadata element and the second metadata element are associated with the same object identifier, that is, they are part of the same object. In some embodiments, the first metadata element and the second metadata element are associated with different object identifiers, that is, they are part of different objects. In some embodiments, the offset range associated with the object corresponds to a single metadata element. In some embodiments, the offset range associated with the object corresponds to a plurality of metadata elements.

At 706, a common sequence of chunk identifiers is determined for at least a portion of the first group of chunk identifiers associated with the first content identifier structure and a portion of the second group of chunk identifiers associated with the second content identifier structure.

The storage system may determine a chunk identifier marker for a chunk identifier sequence by calculating a modulus value (e.g., M % N) for each chunk identifier included in the chunk identifier sequence associated with the first content identifier structure and the second content identifier structure. A chunk identifier may be determined to be a candidate as a chunk identifier marker for the chunk identifier sequence in the event the determined modulus value for the chunk identifier is zero. The storage system may determine potential chunk identifier sequences that are common to the first and second groups based on the candidate chunk identifier markers. The storage system may then determine whether any of the potential chunk identifier sequences associated with the first group overlap with any of the other potential chunk identifier sequences associated with the second group.

In some embodiments, a first data structure that includes entries corresponding to the first content identifier structure and the second content identifier structure is divided into a plurality of segments and worker processes are assigned to a corresponding segment. Each worker process is configured to identify, within the assigned segment, entries that include a chunk identifier sequence that partially overlaps with a chunk identifier sequence associated with at least one other entry of the first data structure. The worker processes may work in parallel to identify the entries. This reduces the amount of time needed to identify entries of chunk identifier sequences that overlap with other entries. After each worker process completes its task, the identified entries may be merged to generate a complete list of entries with a chunk identifier sequence that overlaps with other entries.

At 708, a new data chunk corresponding to a common sequence of chunk identifiers is created in a new chunk file. For example, a new data chunk "α" may be generated in a new chunk file to store the data chunks associated with a common sequence of chunk identifiers of "ABCD."

At 710, a chunk file metadata table is updated. The chunk file metadata table is updated to an entry corresponding to the new data chunk. This enables the data chunks associated with a common sequence identifier to be located.

At 712, a portion of the first group of chunk identifiers associated with the first content identifier structure and a portion of the second group of chunk identifiers associated with the second content identifier structure are updated to reference a common sequence identifier in place of the determined common sequence of chunk identifiers. The storage system stores a first data structure that associates a content identifier structure with one or more chunk identifiers corresponding to the one or more data chunks. The entries corresponding to the first content identifier structure and the second content identifier structure are updated to reference the common sequence identifier and the new chunk file that stores the data chunks associated with the common sequence identifier.

Figure 8:
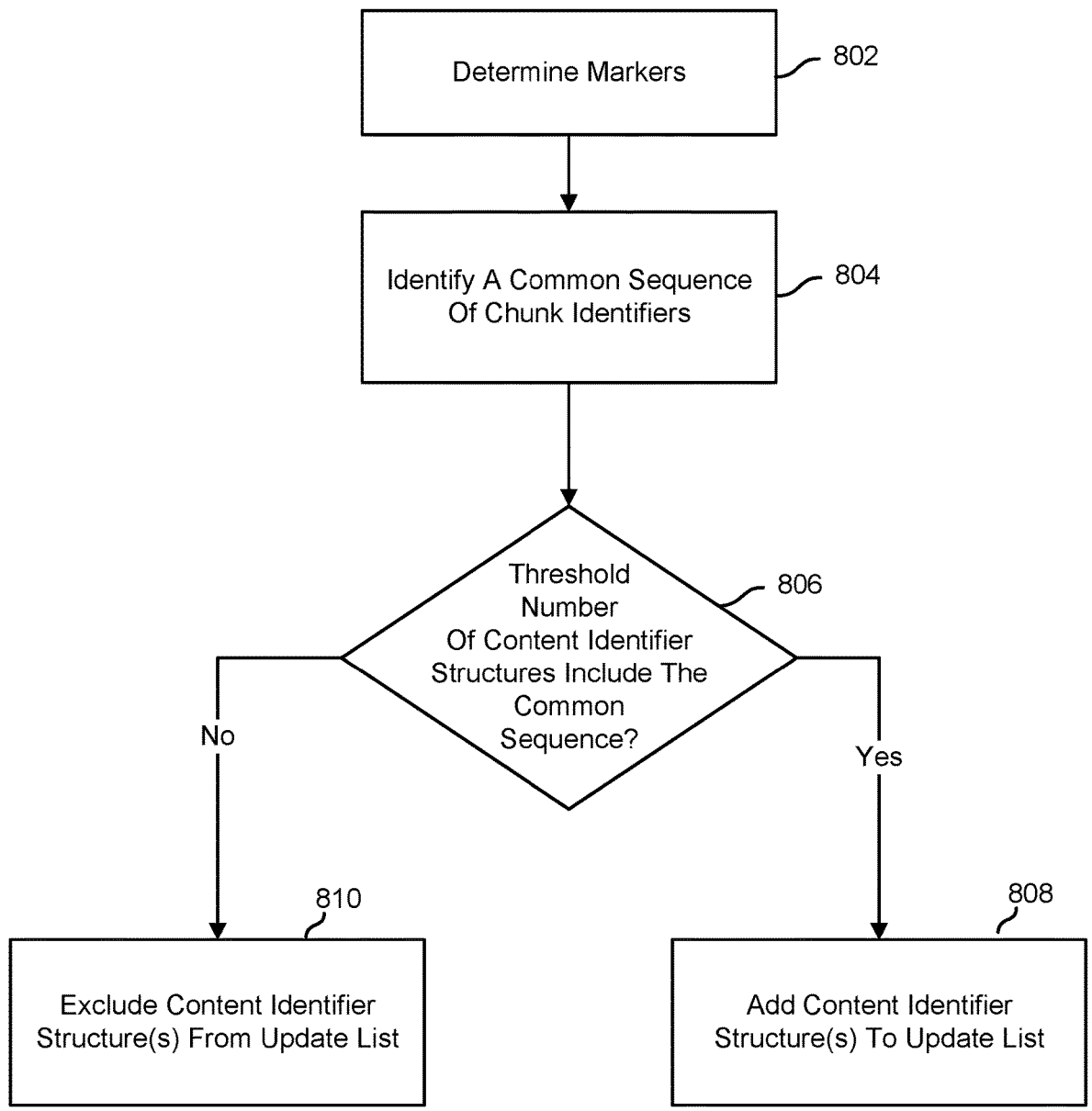
FIG. 8 is a flow diagram illustrating a process for determining a common sequence of chunk identifiers in accordance with some embodiments.

FIG. 8 is a flow diagram illustrating a process for determining a common sequence of chunk identifiers in accordance with some embodiments. In the example shown, process 800 may be implemented to performed by a storage system, such as storage system 112. In some embodiments, process 800 is implemented to perform some or all of step 706 of process 700.

At 802, chunk identifier markers are determined. A storage system may determine a chunk identifier marker for a chunk identifier sequence by calculating a modulus value (e.g., M % N) for each chunk identifier included in the chunk identifier sequence associated with a content identifier structure.

At 804, a common sequence of chunk identifiers is determined. The storage system may determine potential chunk identifier sequences for an object based on the candidate chunk identifier markers. For example, a first content identifier structure may be associated with the chunk identifier sequence of "ABCDEF" and a second content identifier structure may be associated with the chunk identifier sequence of "ABCDEX." The chunk identifiers of "D" and "X" may be determined to be candidates for chunk identifier markers.

In some embodiments, a chunk identifier marker is a starting chunk identifier for a potential chunk identifier sequence that is common to a plurality of entries. For example, potential chunk identifier sequences that are common to a plurality of entries may be "DEF" or "DEX." A potential chunk identifier sequence that is common to a plurality of entries may include the chunk identifier marker as the first chunk identifier in the chunk identifier sequence and a chunk identifier that precedes a next chunk identifier marker as the last chunk identifier included in the chunk identifier sequence.

In some embodiments, a chunk identifier marker is an ending chunk identifier for a potential chunk identifier sequence that is common to a plurality of entries. The potential chunk identifier sequence may include any non-chunk identifier markers that precede the chunk identifier marker. In the above example, the common chunk identifier sequence is "ABCD."

The storage system may determine a common chunk identifier sequence within a particular offset range of an object. In some embodiments, the particular offset range corresponds to a single content identifier structure. In some embodiments, the particular offset range corresponds to a plurality of content identifier structures of an object. In some embodiments, a chunk identifier sequence is common to a plurality of content identifier structures associated with a same object. In some embodiments, a chunk identifier sequence is common to a plurality of content identifier structures associated with a plurality of objects.

In some embodiments, the shared chunk identifier sequence spans a plurality of content identifier structures associated with an object. The plurality of content identifier structures associated with the object are contiguous and correspond to adjacent data chunks of the data object. For example, a first content identifier structure included in a first metadata structure associated with a first object may be associated with a chunk identifier sequence of "ABCDE" and a second content identifier structure included in the first metadata structure associated with the first object may be associated with a chunk identifier sequence of "FGHIJ." The first content identifier structure included in the first metadata structure associated with the first object may correspond to an object offset of 0-2 MB of the first object and the second content identifier structure included in the first metadata structure associated with the first object may correspond to an object offset of 2 MB-4 MB of the first object. A first content identifier structure included in a second metadata structure associated with a second object may be associated with a chunk identifier sequence of "BCDEF" and a second content identifier structure included in the second metadata structure associated with the second object may be associated with a chunk identifier sequence of "GXYZ." The first content identifier structure included in a second metadata structure associated with a second object may correspond to an object offset of 10 MB-12 MB of the second object and the second content identifier structure included in the second metadata structure associated with the second object may correspond to an object offset of 12 MB-14 MB of the second object. In this example, one of the common chunk identifier sequences is "BCDEFG."

At 806, it is determined whether a threshold number of content identifier structures includes the common sequence. The threshold number of entries is a configurable number. In some embodiments, the threshold number of entries is 2. In some embodiments, the threshold number of entries is larger than 2 (e.g., 20). The process of updating a chunk metadata table, chunk file metadata table, and creating new chunk files requires a certain amount of time and resources to perform. The storage system may perform other processes, such as backup, restore, replication, migration, etc., during this process. Thus, the threshold number of entries may be adjusted based on available resources of the storage system to balance the desired space savings with the time and resources required to achieve the desired space savings.

In the event a threshold number of content identifier structures includes the common sequence, process 800 proceeds to 808 where the content identifier structures that include the common sequence are added to a list of entries to update.

In the event a threshold number of content identifier structures do not include the common sequence, process 800 proceeds to 810 where the content identifier structure(s) that include the common sequence are not added to the list of entries to update.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication to deduplicate metadata stored in a first data structure stored by a storage system; and
deduplicating the metadata stored by the storage system in part by:
determining a first group of chunk identifiers associated with a first content identifier structure of a first metadata element and a second group of chunk identifiers associated with a second content identifier structure of a second metadata element, wherein the first group of chunk identifiers is associated with a first plurality of data chunks and the second group of chunk identifiers is associated with a second plurality of data chunks, wherein a chunk identifier associated with the first group and second group of chunk identifiers individually represents a data chunk associated with the chunk identifier;

determining a common sequence of chunk identifiers across at least a portion of the first group of chunk identifiers associated with the first content identifier structure and the second group of chunk identifiers associated with the second content identifier structure, wherein the common sequence of chunk identifiers is associated with a first subset of the first plurality of data chunks and a second subset of the second plurality of data chunks; and updating in the first data structure a portion of the first group of chunk identifiers associated with the first content identifier structure and a portion of the second group of chunk identifiers associated with the second content identifier structure to reference a common sequence identifier in place of the determined common sequence of chunk identifiers, wherein the common sequence identifier represents the first subset of the first plurality of data chunks as a subgroup and represents the second subset of the second plurality of data chunks as the subgroup, wherein the first data structure includes a plurality of entries, wherein a first entry of the plurality of entries corresponds to the first metadata element and a second entry of the plurality of entries corresponds to the second metadata element, wherein the first metadata element corresponds to a first leaf node associated with the first content identifier structure and the second metadata element corresponds to a second leaf node associated with the second content identifier structure.

2. The method of claim 1, wherein the first group of chunk identifiers and the second group of chunk identifiers are determined based on an object identifier and an offset range associated with an object.

3. The method of claim 1, wherein the first metadata element and the second metadata element are associated with a same object.

4. The method of claim 1, wherein the first metadata element and the second metadata element are associated with different objects.

5. The method of claim 1, wherein determining the common sequence of chunk identifiers includes determining one or more chunk identifier markers for a chunk identifier sequence.

6. The method of claim 5, wherein the one or more chunk identifier markers are determined including by determining corresponding modulus values for chunk identifiers included in the first group and the second group.

7. The method of claim 5, wherein determining the common sequence of chunk identifiers further includes determining potential chunk identifier sequences for the first group and the second group based on the one or more determined chunk identifier markers.

8. The method of claim 7, further comprising determining whether any of the potential chunk identifier sequences are included in the first group and the second group.

9. The method of claim 8, wherein a potential chunk identifier sequence is determined to be the common sequence of chunk identifiers in the event the potential chunk identifier sequence is included in the first group and the second group.

10. The method of claim 1, further comprising creating a new data chunk corresponding to the common sequence of chunk identifiers in a chunk file.

11. The method of claim 10, further comprising updating a data structure to reference the new data chunk.

12. The method of claim 1, wherein determining the common sequence of chunk identifiers includes determining whether the common sequence of chunk identifiers is included in at least a threshold number of entries of the first data structure.

13. The method of claim 12, wherein the portion of the first group of chunk identifiers associated with the first content identifier structure and the portion of the second group of chunk identifiers associated with the second content identifier structure to reference the common sequence identifier in place of the determined common sequence of chunk identifiers is updated in the event the common sequence of chunk identifiers is included in the at least threshold number of entries of the first data structure.

14. The method of claim 12, wherein the threshold number of entries is adjustable based on available resources of a storage system.

15. The method of claim 1, wherein the first content identifier structure corresponds to the first entry of the first data structure and the second content identifier structure corresponds to the second entry of the first data structure.

16. The method of claim 15, wherein determining the common sequence of chunk identifiers comprises:
dividing the first data structure into a plurality of segments; and
assigning a worker process to one of the plurality of segments.

17. A computer program product embodied in a non-transitory computer readable medium and comprising computer instructions for:
receiving an indication to deduplicate metadata stored in a first data structure stored by a storage system; and
deduplicating the metadata stored by the storage system in part by:
determining a first group of chunk identifiers associated with a first content identifier structure of a first metadata element and a second group of chunk identifiers associated with a second content identifier structure of a second metadata element, wherein the first group of chunk identifiers is associated with a first plurality of data chunks and the second group of chunk identifiers is associated with a second plurality of data chunks, wherein a chunk identifier associated with the first group and second group of chunk identifiers individually represents a data chunk associated with the chunk identifier;
determining a common sequence of chunk identifiers across at least a portion of the first group of chunk identifiers associated with the first content identifier structure and the second group of chunk identifiers associated with the second content identifier structure, wherein the common sequence of chunk identifiers is associated with a first subset of the first plurality of data chunks and a second subset of the second plurality of data chunks; and
updating in the first data structure a portion of the first group of chunk identifiers associated with the first content identifier structure and a portion of the second group of chunk identifiers associated with the second content identifier structure to reference a common sequence identifier in place of the determined common sequence of chunk identifiers, wherein the common sequence identifier represents the first subset of the first plurality of data chunks as a subgroup and represents the second subset of the second plurality of data chunks as the subgroup, wherein the first data structure includes a plurality of entries, wherein a first entry of the plurality of entries corresponds to the first metadata element and a second entry of the plurality of entries corresponds to the second metadata element, wherein the first metadata element corresponds to a first leaf node associated with the first content identifier structure and the second metadata element corresponds to a second leaf node associated with the second content identifier structure.

18. The computer program product of claim 17, wherein the first group of chunk identifiers and the second group of chunk identifiers are determined based on an object identifier and an offset range associated with an object.

19. A system, comprising:
a processor configured to:
  receive an indication to deduplicate metadata stored in a first data structure stored by a storage system; and
  deduplicate the metadata stored by the storage system in part by:
    determine a first group of chunk identifiers associated with a first content identifier structure of a first metadata element and a second group of chunk identifiers associated with a second content identifier structure of a second metadata element, wherein the first group of chunk identifiers is associated with a first plurality of data chunks and the second group of chunk identifiers is associated with a second plurality of data chunks, wherein a chunk identifier associated with the first group and second group of chunk identifiers individually represents a data chunk associated with the chunk identifier;
    determine a common sequence of chunk identifiers across at least a portion of the first group of chunk identifiers associated with the first content identifier structure and the second group of chunk identifiers associated with the second content identifier structure, wherein the common sequence of chunk identifiers is associated with a first subset of the first plurality of data chunks and a second subset of the second plurality of data chunks; and
    update in the first data structure a portion of the first group of chunk identifiers associated with the first content identifier structure and a portion of the second group of chunk identifiers associated with the second content identifier structure to reference a common sequence identifier in place of the determined common sequence of chunk identifiers, wherein the common sequence identifier represents the first subset of the first plurality of data chunks as a subgroup and represents the second subset of the second plurality of data chunks as the subgroup, wherein the first data structure includes a plurality of entries, wherein a first entry of the plurality of entries corresponds to the first metadata element and a second entry of the plurality of entries corresponds to the second metadata element, wherein the first metadata element corresponds to a first leaf node associated with the first content identifier structure and the second metadata element corresponds to a second leaf node associated with the second content identifier structure; and
a memory coupled to the processor and configured to provide the processor with instructions.

\* \* \* \* \*